United States Patent
Hoshiya et al.

(10) Patent No.: US 7,440,240 B2
(45) Date of Patent: Oct. 21, 2008

(54) MAGNETIC HEAD WITH DOMAIN STABILIZATION AND MAGNETIC RECORDING/REPRODUCING APPARATUS USING THE SAME

(75) Inventors: Hiroyuki Hoshiya, Kanagawa (JP); Katsumi Hoshino, Kanagawa (JP); Masahiko Hatatani, Kanagawa (JP); Kenichi Meguro, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 341 days.

(21) Appl. No.: 11/102,067

(22) Filed: Apr. 8, 2005

(65) Prior Publication Data
US 2005/0225907 A1    Oct. 13, 2005

(30) Foreign Application Priority Data
Apr. 9, 2004    (JP) ............................... 2004-115773

(51) Int. Cl.
*G11B 5/33*    (2006.01)
(52) U.S. Cl. ................................. 360/324.12
(58) Field of Classification Search .............. 360/324.1, 360/324.11, 324.12, 324.2
See application file for complete search history.

(56) References Cited

U.S. PATENT DOCUMENTS

| | | | |
|---|---|---|---|
| 5,408,377 A | 4/1995 | Gurney et al. | |
| 6,023,395 A | 2/2000 | Dill et al. | |
| 6,473,279 B2 | 10/2002 | Smith et al. | |
| 6,704,175 B2 * | 3/2004 | Li et al. .................. | 360/324.11 |
| 6,765,770 B2 * | 7/2004 | Dee ....................... | 360/324.12 |
| 6,829,161 B2 * | 12/2004 | Huai et al. .................. | 365/158 |
| 6,831,816 B2 * | 12/2004 | Gill ........................ | 360/324.12 |
| 6,856,493 B2 * | 2/2005 | Pinarbasi ................ | 360/324.11 |
| 6,937,449 B2 * | 8/2005 | Hoshiya et al. ......... | 360/324.12 |
| 6,947,263 B2 * | 9/2005 | Saito ....................... | 360/324.12 |
| 6,947,264 B2 * | 9/2005 | Gill ......................... | 360/324.2 |
| 7,023,670 B2 * | 4/2006 | Saito ....................... | 360/324.12 |
| 7,180,716 B2 * | 2/2007 | Li et al. .................. | 360/324.12 |
| 7,199,984 B2 * | 4/2007 | Carey et al. ............. | 360/324.12 |
| 7,242,556 B2 * | 7/2007 | Gill ......................... | 360/324.12 |
| 7,245,463 B2 * | 7/2007 | Gill ......................... | 360/324.12 |
| 7,248,445 B2 * | 7/2007 | Nishiyama ................ | 360/324.1 |
| 7,280,325 B1 * | 10/2007 | Pan ......................... | 360/324.12 |
| 2003/0143431 A1 * | 7/2003 | Hasegawa .................... | 428/692 |

FOREIGN PATENT DOCUMENTS

| | | |
|---|---|---|
| JP | 11-259824 A | 9/1999 |
| JP | 2002-025013 A | 1/2002 |
| JP | 2002-367124 A | 12/2002 |

OTHER PUBLICATIONS

Yuasa et al., "Output Enhancement of Spin-Valve Giant Magnetoresistance in Current-Perpendicular-to-Plane Geometry," Journal of Applied Physics, vol. 92, No. 5, pp. 2646-2650, 2002.

* cited by examiner

*Primary Examiner*—Angel A Castro
(74) *Attorney, Agent, or Firm*—Townsend and Townsend and Crew LLP; Rambod Nader

(57) ABSTRACT

Embodiments of the invention provide a spin-valve type magnetic head that satisfies the requirements of both high read output and stability with narrow tracks. In one embodiment, a domain control film is formed on a magnetoresistive layered film in the same track width. A double closed flux path structure that uses three magnetic layers is employed with magnetic coupled structure in both ends of the track. The three magnetic layers are a soft magnetic free layer, a domain-stabilization ferromagnetic layer, and a soft magnetic anti-parallel layer.

10 Claims, 14 Drawing Sheets

(PRIOR ART)

MAGNETIC HEAD WITH DOMAIN STABILIZATION AND MAGNETIC RECORDING/REPRODUCING APPARATUS USING THE SAME

CROSS-REFERENCES TO RELATED APPLICATIONS

This application claims priority from Japanese patent application No. JP 2004-115773, filed Apr. 9, 2004, the entire disclosure of which is incorporated herein by reference.

BACKGROUND OF THE INVENTION

The present invention relates to a magnetic head and a recording/reproducing apparatus that uses the same, more particularly to a magnetic head including a magnetoresistive sensor and a magnetic recording/reproducing apparatus that uses the same.

The high recording density magnetic recording technique that mainly handles hard disk drives uses such a magnetoresistive head as a read sensor. The read sensor depends significantly on the performance of the magnetic recording technique. While the recording density of magnetic recording/reproducing apparatuses has been improved rapidly, none of the prior techniques has realized a magnetoresistive head having both sensitivity and output with good symmetric performance for external magnetic field to meet the requirements of very high recording density magnetic recording/reproducing apparatuses, particularly their reproducing parts. It has thus been difficult for the prior techniques to realize the functions required for the apparatuses to be employed as storage devices.

In recent years, it has been well known that a large magnetoresistance, that is, a so-called giant magnetoresistance, is recognized in a multilayer consisting of ferromagnetic metallic layers separated by a non-magnetic metallic layer from each other. The giant magnetoresistance is a phenomenon that the electrical resistance changes according to an angle of the magnetizations between two ferromagnetic layers separated by a non-magnetic intermediate layer. If this giant magnetoresistance is applied to a magnetoresistive sensor, a structure referred to as a spin-valve should also be employed for the structure. In other words, the spin-valve is structured to include an antiferromagnetic film, a ferromagnetic layer, a non-magnetic intermediate layer, and a soft magnetic free layer that are laminated in order. The spin-valve functions to pin the magnetization of a ferromagnetic layer stuck fast to an antiferromagnetic film due to an exchange coupling field generated in an antiferromagnetic film/ferromagnetic layer interface substantially so that the other soft magnetic free layer is magnetized and its magnetizing direction is rotated by an external magnetic field, thereby obtaining an output. Hereinafter, the above pinning effect will be referred to as pinning bias and an antiferromagnetic film that generates such an effect will be referred to as a pinning bias layer. A ferromagnetic layer having a magnetizing direction pinned substantially will be referred to as a pinned layer or ferromagnetic pinned layer. Similarly, a soft magnetic layer that is magnetized with its magnetizing direction rotated by an external magnetic field will be referred to as a free layer or soft magnetic free layer.

A pinned layer has a magnetizing direction pinned substantially with respect to a magnetic field to be perceived. Its antimagnetic film may be replaced with a hard magnetic film, that is, a material having a magnetizing direction that is to be changed only by application of a comparatively large magnetic field respectively. As is well known, anti-parallel coupled high coercivity film, that is, a so-called self-pin, is used as a hard magnetic film. In recent years, it is also proposed to use a multilayer consisting of ferromagnetic pinned layers having a specular effect and/or synthetic ferrimagnet. However, they are all the same in that the magnetizing direction of a ferromagnetic layer at interface contact with a non-magnetic intermediate layer directly is substantially pinned. The tunneling magnetoresistance, that is, a current-perpendicular-to-the-plane type magnetoresistive sensor referred to as a so-called TMR is also the same as that in the basic structure.

The magnetoresistive head has a domain control structure for stabilizing the domain of a soft magnetic free layer. This domain control structure enables a soft magnetic free layer to stabilize its single domain structure to provide a no hysteresis output with a magnetic field to be perceived. The hard bias, which has a typical domain control structure, is configured as shown below. A hard magnetic film is provided at both ends of a magnetoresistive film formed in the track width at a predetermined thickness. The hard magnetic film is magnetized so as to have some residual magnetization in the track width direction in a magnetizing process and that residual magnetization enables canceling of both of the magnetic charge generated at the track width end portion and the magnetic charge generated at the end portion of the soft magnetic free layer mutually to lower the static magnetic energy and perform single domain-stabilization of the soft magnetic free layer.

There is also proposed an in-stack type domain control structure as a domain control structure corresponding to higher recording density. In this structure, domain control layers are laminated on a magnetoresistive film. All the domain control layers are formed almost in the track width so that they are self-aligned at their ends for enabling domain control. The following discussion will refer to these references:

Patent document 1: U.S. Pat. No. 5,408,377;
Patent document 2: Official gazette of JP-A No. 259824/1999;
Patent document 3: U.S. Pat. No. 6,023,395;
Patent document 4: Official gazette of JP-A No. 025013/2002;
Patent document 5: U.S. Pat. No. 6,473,279;
Patent document 6: Official gazette of JP-A No. 367124/2002; and
Non-patent document 1: JOURNAL OF APPLIED PHYSICS VOLUME 92, 2646-2650 (2002), H. Yuasa, M. Yoshikawa, Y. Kamiguchi, K. Koi, H. Iwasaki, M. Takagishi, and M. Sahashi, "Output enhancement of spin-valve giant magnetoresistance in current-perpendicular-to-plane geometry."

BRIEF SUMMARY OF THE INVENTION

However, a problem arises in the single domain-stabilization realized by the above in-stack type domain control structure. When the track of the magnetoresistive sensor is narrowed, more specifically when the track width becomes 0.1 µm or smaller, the influence of the demagnetizing field at the ends of the magnetic film surpasses the single domain-stabilization effect, thereby disturbing the linear output of the magnetoresistive sensor with respect to the magnetic field to be perceived. In order to prevent the problem, the influence of the magnetic film ends must be minimized, by improving the stability with respect to the external magnetic field and the demagnetizing field of the domain-stabilization ferromagnetic layer to be laminated. Concretely, the domain-stabilization ferromagnetic layer to be laminated should be reduced in thickness and the soft magnetic free layer should be reduced in magnetization amount to balance the magnetization amount between those layers. This is because the demagnetizing field cannot be reduced unless the magnetic charges at the laminated portions are canceled by each other at their ends to form a closed flux path between them. Such reduction of each magnetization amount is realized by reducing the magnetic film in thickness. In that respect, however, the magnetoresistance is reduced, whereby the magnetic film that functions as a read sensor is degraded.

Conventionally, the competition between high sensitivity and stability has been balanced by minimizing the magnetic film in thickness up to a value that assures outputs. In that case, however, the track is narrowed in width; whereby the stability comes to be insufficient for optimizing outputs. This phenomenon cannot be overcome by any conventional technique having been disclosed as in-stack type domain control techniques. For example, in the patent documents 4 to 6, it is proposed to form a three-layer unit consisting of domain control and free layers. In the three-layer units, however, there comes to appear a forward parallel portion in the components adjacent to each other like →, →, ←. This is why it is impossible to reconcile the stabilization realized by thinning the domain-stabilization ferromagnetic layer and keeping the large magnetoresistive output with the use of a free layer having a predetermined thickness. In order to reconcile both of the stability and keeping of the output described above, further stabilized domain control layered structure is needed. The domain control structure and the magnetoresistive layered film of prior techniques have not realized such a stable structure for magnetic heads having a narrower track width respectively in recent years.

Under such circumstances, it is a feature of the present invention to provide a spin-valve type magnetic head that has an in-stack type domain control structure and can reconcile both high output and stable operation corresponding to higher recording density.

Embodiments of the present invention use a spin-valve type giant magnetoresistive layered film, that is, a magnetoresistive sensor having a layered structure of soft magnetic free layer/non-magnetic intermediate layer/ferromagnetic pinned layer/antiferromagnetic film as a magnetic sensor to be mounted in the magnetic head corresponding to the high recording density. The antiferromagnetic film is used to apply an exchange coupling bias to the ferromagnetic pinned layer so as to pin the magnetization of the ferromagnetic pinned layer substantially. The antiferromagnetic film may be formed so as to be stuck fast to the ferromagnetic pinned layer directly or the same effect may be obtained for the antiferromagnetic film indirectly through magnetic coupling. Instead of the antiferromagnetic film, another bias applying mechanism, for example, the residual magnetization of the hard magnetic film, may be used or current bias may be used.

In order to obtain the magnetic sensor and the magnetic head corresponding to the high recording density as described above, the present embodiment forms a soft magnetic anti-parallel layer on a soft magnetic free layer through an anti-parallel coupling layer, then forms a domain-stabilization ferromagnetic layer through a weak anti-parallel coupling layer, for example. The anti-parallel coupling layer causes magnetic coupling between the soft magnetic free layer and the soft magnetic anti-parallel layer so that they are magnetized in anti-parallel to each other. The anti-parallel coupling is formed strongly enough with respect to the magnetic field to be perceived, so that the anti-parallel magnetizing directions of the soft magnetic free layer and the soft magnetic anti-parallel layer come to rotate as a pair substantially with respect to the magnetic field to be perceived.

The weak anti-parallel coupling layer enables weak magnetic coupling between the domain-stabilization ferromagnetic layer and the soft magnetic anti-parallel layer in anti-parallel to each other. The weak coupling mentioned here means having an equal to or weaker anti-parallel coupling force with respect to a magnetic field to be perceived. In other words, when the value of the magnetic field is around 0, the soft anti-parallel layer and the domain-stabilization ferromagnetic layer are magnetized in anti-parallel to each other and each of those layers comes to have a certain coupling force for changing the angle made between the magnetizing directions of the soft anti-parallel layer and the domain-stabilization ferromagnetic layer with respect to the external magnetic field to be perceived. More concretely, the soft anti-parallel layer and the domain-stabilization ferromagnetic layer are composed so as to have an anti-parallel coupling magnetic field of about a few tens to a few hundreds of Oersteds respectively when the value is represented by the magnetic field unit. The weak anti-parallel coupling layer enables weak magnetic coupling between two adjacent ferromagnetic layers to make the two layers to be coupled in a weak antiferromagnetic manner, that is, make the two layers magnetized in anti-parallel to each other when the magnetic field value is zero. The weak anti-parallel coupling layer may be a layered structure formed by depositing about 0.4 nm of Cu on a 0.8 Ru layer so as to realize controllable weak anti-parallel magnetic exchange coupling between two layers. It is also possible to realize such controllable weak anti-parallel magnetic coupling between magnetizing directions of the adjacent two layers with the use of a static magnetic coupling force generated at the sensor ends even when a material such as Ta 1 nm as an anti-parallel coupling layer that generates no in-plane magnetic exchange coupling between adjacent layers is used.

In another configuration of the magnetic head, the present embodiment forms a soft magnetic anti-parallel layer on a soft magnetic free layer through a weak anti-parallel coupling layer, then forms a domain-stabilization ferromagnetic layer thereon through an anti-parallel coupling layer. In that connection, the soft magnetic anti-parallel layer and the domain-stabilization ferromagnetic layer are coupled fast with respect to the magnetic field to be perceived and the magnetizing direction of the soft magnetic free layer rotates with respect to the magnetic field.

Because of the above described composition of the anti-parallel coupling layer and the weak anti-parallel coupling layer, when the magnetic field value is zero, the in-stack type domain control structure according to the present invention, that is, the three adjacent magnetic layers that are a domain-stabilization ferromagnetic layer, a soft anti-parallel layer, and a soft magnetic free layer can be magnetized in anti-parallel to each another like right/left/right. Consequently, each of the domain-stabilization ferromagnetic layer, the soft anti-parallel layer, and the soft magnetic free layer can have a double closed flux path structure, thereby the stability of the magnetic sensor is improved.

One feature of the present invention is to increase the number of sensors of a magnetic layer in which a closed flux path is formed for stable domain control from 2 to 3 or more so that domain control is realized with double or triple closed flux paths to control the balance among magnetization amounts more accurately. The domain-stabilization ferromagnetic layer, the non-magnetic isolated layer (anti-parallel coupling layer/weak anti-parallel coupling layer), and the soft magnetic free layer are formed almost in the same track width and self-aligned at their ends while the domain-stabilization ferromagnetic layer can generate a magnetic charge effectively in the track width direction due to the residual magnetization so that the soft magnetic free layer and the soft magnetic anti-parallel layer can cancel the magnetic charges each other at their ends to enable such single domain-stabilization. In other words, the domain-stabilization ferromagnetic layer and the soft magnetic free layer are composed so as to cancel the magnetic charges mutually at the end of the soft magnetic anti-parallel layer. In other words, the domain-stabilization ferromagnetic layer and the soft magnetic free layer are composed so that the total of the magnetic amounts of the domain-stabilization ferromagnetic layer and the soft magnetic free layer (the total of the products of the magnetic flux density and the film thickness) becomes approximately the same as the magnetic amount of the soft anti-parallel layer. This is because the domain-stabilization ferromagnetic layer and the soft magnetic anti-parallel layer, as well as the ferromagnetic free layer and the soft magnetic anti-parallel layer, are magnetized in anti-parallel to each other respectively when the magnetic field value is around zero. It is also possible to set the total of the magnetization amounts of the domain-stabilization ferromagnetic layer and the soft magnetic free layer larger than the magnetization amount of the soft magnetic anti-parallel layer only slightly (about 20%) with expectation of a slight loss of the magnetic charge at the end. Because the domain control structure is assumed as described above, the present invention can obtain the above single domain-stabilization effect stably without using any other domain control structure, such as a hard bias structure.

The domain-stabilization ferromagnetic layer is formed so as to include a ferromagnetic material so as to generate a magnetic charge in a predetermined amount in the track width direction. An antiferromagnetic film can be used to generate the magnetic charge. In other words, an antiferromagnetic film/ferromagnetic layer structure is employed to generate an exchange coupling field in the ferromagnetic layer from the antiferromagnetic film and this exchange coupling field direction is defined as the track width direction. The domain-stabilization ferromagnetic layer may be formed with a hard magnetic film. In principle, the hard magnetic film is magnetized in the track width direction so that a single domain-stabilization effect is obtained by the residual magnetization.

The ferromagnetic pinning layer must be magnetized approximately in parallel to the magnetic field to be perceived and the domain-stabilization ferromagnetic layer must be magnetized approximately perpendicularly to the direction of the magnetic field to be perceived. This is referred to as magnetization process. Magnetization process in each predetermined direction is made in a manufacturing process. The magnetization process is divided into two types; magnetization at the room temperature and magnetization by heating or through a thermal treatment in an oven or on a hot plate. Magnetization in different directions is also possible by combining the magnetization process at the room temperature with the magnetization process through a thermal treatment or combining the magnetization processes through thermal treatments under different temperatures. Different materials/means should preferably be used for applying a pinning bias to the object ferromagnetic pinned layer and pinning of magnetizing direction in the object domain-stabilization ferromagnetic layer. Concretely, the ferromagnetic pinned layer can be magnetized with use of a hard magnetic film at the room temperature while the domain-stabilization ferromagnetic layer can be formed with an antiferromagnetic film, then it is subjected to a thermal treatment for magnetization. It is also possible to subject the ferromagnetic pinned layer to a thermal treatment for magnetization with use of an MnPt antiferromagnetic film that can retain an exchange coupling magnetic field up to a high temperature of about 250 to 300° C., then form a magnetic film by pinning the domain-stabilization ferromagnetic layer with an MnIr antiferromagnetic film and subject the domain-stabilization ferromagnetic layer MnIr to a thermal treatment for magnetization in different directions under 200° C., thereby obtaining desired characteristics.

The anti-parallel coupling layer, which is one of the features of the present invention, is formed with a material causing no spontaneous magnetization at a predetermined thickness at the room temperature and at the operation temperature of the magnetic head so as to enable in-plane antiferromagnetic coupling between the soft magnetic free layer and the soft magnetic anti-parallel layer that are in contact with each other on their planes through an anti-parallel coupling layer. It is well known that if a sandwich structure like Co/Ru/Co is formed at a specific Ru thickness, for example, 0.3 to 0.8 nm, with use of any of such materials as Ru, Ir, Os, Re, Rh, etc., strong on-plane antiferromagnetic coupling is realized between Co layers. The force of such antiferromagnetic coupling reaches a few kilo-Oersteds, that is, a few hundreds of KA/m. Because such strong antiferromagnetic coupling is desired for the anti-parallel coupling layer of the present invention, such a material as the above Ru should preferably be deposited as the non-magnetic isolated layer at a predetermined thickness, for example, 0.3 to 0.8 nm.

On the contrary, the weak anti-parallel coupling layer of the present invention should be weaker in effect than the above anti-parallel coupling layer. Concretely, any of such materials as Ru, Ir, Os, Re, Rh, etc., that are all favorable materials for the above anti-parallel coupling layer is alloyed with another to dilute the material or laminated with another extremely thin material to realize predetermined weak anti-parallel coupling. Another material described above may be any of the following general materials such as Cu, Ta, etc., to save the cost.

Each of the above configurations of the present invention can apply to any of magnetic sensors and magnetic heads that employ the current-perpendicular-to-the plane type giant magnetoresistance referred to as CPP-GMR, as well as tunneling magnetoresistance and any of the CIP (in-plane current type)-GMR magnetic sensors and magnetic heads having been used in prior art.

As described above, the present invention employs a double closed flux path structure in which three magnetic layers of a soft magnetic anti-parallel layer, a soft magnetic free layer, and a domain-stabilization ferromagnetic layer can cancel their edge magnetization each other. This is why the present invention can realize a magnetoresistive magnetic sensor that reconciles both of high output and stability. As such, this sensor can be used as a read head in a magnetic recording/reproducing apparatus to realize high recording density, that is, recording in a shorter wavelength and in a narrower track width on the subject recording medium, thereby obtaining a sufficient read output and keeping the recording in a desired state.

DETAILED DESCRIPTION OF THE INVENTION

Hereunder, the examples of the present invention will be described with reference to the accompanying drawings. To make it easier to understand, the same numerals/symbols will be used for the same functional items in those drawings.

A thin film of a giant magnetoresistive layered film according to an embodiment of the present invention is formed as follows with the use of a radio-frequency magnetron sputtering apparatus. The following materials are layered on a ceramic substrate sequentially in an atmosphere of 1 to 6 mTorr of argon. As sputtering targets, tantalum, a nickel-20 at % iron alloy, copper, cobalt, MnPt, ruthenium, alumina, magnetite, and MnIr are used. At first, on a Co target is disposed 1 cm square Fe chips as needed to adjust the composition. On the Co target is disposed Pt chips to form a CoPt film. A layered film is formed by applying a high frequency power to each cathode on which a target is disposed to generate plasma in the apparatus beforehand, then by opening/closing the shutter disposed on each cathode sequentially. When in film deposition, permanent magnets are used to apply a magnetic field of about 80 Oersteds onto the substrate in parallel so as to cause uni-axial anisotropy thereon.

The formed film is then subjected to a thermal treatment under vacuum at 270° C. in a magnetic field for three hours to change the phase of the MnPt antiferromagnetic film. After that, the magnetoresistance of the film is measured and evaluated at the room temperature. If an antiferromagnetic film other than the MnPt one is to be formed at that time, the substrate is subjected to a thermal treatment for magnetization at a different temperature. If a hard magnetic film is needed for the composition, the magnetization process at room temperature is performed after the thermal treatment. To form sensors on the substrate, the film on the substrate is patterned in a photo-lithography process. After that, the substrate is subjected to a slider process, then mounted in the subject magnetic recording/reproducing apparatus. Then, in order to evaluate the domain control structure, the magnetic head is subjected to a magnetizing process simulation with use of the LLG (Landau-Lifshits-Gilbert) method to compare both stability and output of the magnetic head with those of prior art.

Figure 1:
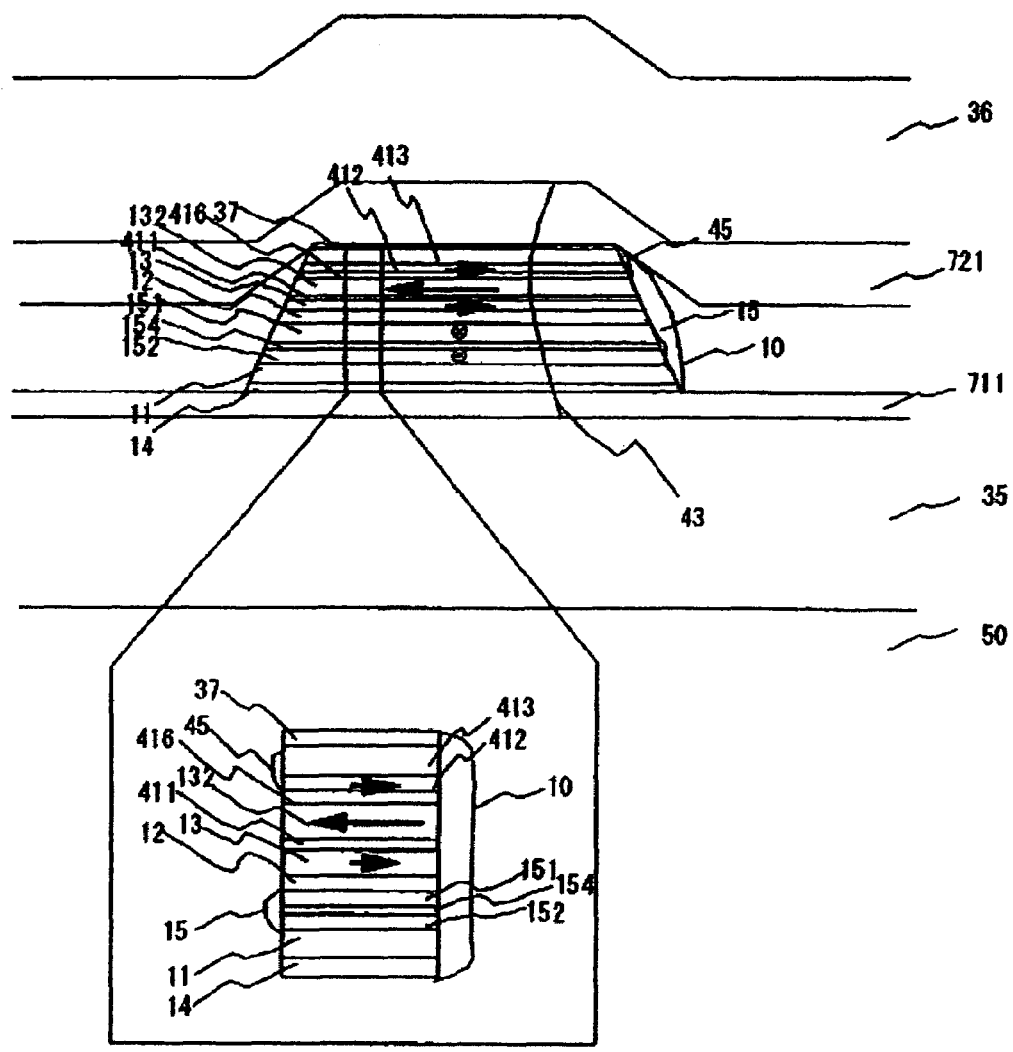
FIG. 1 is a configuration of a magnetoresistive head according to an embodiment of the present invention.

FIG. 1 is a configuration of a giant magnetoresistive head according to an embodiment of the present invention. FIG. 1 is an explanatory view of the magnetic head from the air bearing surface to the magnetic medium. On a substrate 50 are formed a lower magnetic shield 35 and a lower conductive gap film 711. Then, a magnetoresistive layered film 10 is formed thereon. Furthermore, an upper conductive gap film 721 and an upper magnetic shield 36 are formed; thereby a read gap 43 for detecting read signals is formed. In FIG. 1, the magnetoresistive layered film 10 includes a domain-stabilization ferromagnetic layer 45. This is just for convenience, however. The boundary of the magnetoresistive layered film 10 may be formed in any other place with no problem. The lower conductive gap film 711 and the upper conductive gap film 721 are disposed in contact with each other on and under the magnetoresistive layered film 10 in the film thickness direction. Consequently, each of the films 711 and 721 functions as part of an electrode to detect an applied current and changes of the electrical resistance. Although a so-called lift-off method is used to form the electrode in a predetermined shape here, any other suitable method can be used for the same purpose. For example, an electrode is disposed at each of the ends of the track in the width direction and an in-plane current is applied into the magnetoresistive layered film 10.

The magnetoresistive layered film 10 is composed of an underlayer 14, an antiferromagnetic film 11, a ferromagnetic pinned layer 15, a non-magnetic intermediate layer 12, a soft magnetic free layer 13, an anti-parallel coupling layer 411, a soft magnetic anti-parallel layer 132, a weak anti-parallel coupling layer 416, a domain-stabilization ferromagnetic layer 45 that are formed consecutively in order. A protection film 37 improves the corrosion-resistivity, etc., of the magnetic head. However, the protection film 37 may be omitted without running counter to the spirit of the present invention. Similarly, although the underlayer 14 improves the crystallization, the MR ratio, and the soft magnetic characteristic of the magnetic head, it may be omitted without running counter to the spirit of the present invention.

In this configuration, the ferromagnetic pinned layer 15 is a layered film consisting of a first ferromagnetic layer 151, a second ferromagnetic layer 152, and an anti-parallel coupling layer 154. The anti-parallel coupling layer 154 is effective to control an actual amount of magnetization in the ferromagnetic pinned layer to a difference of the magnetization amount between the first ferromagnetic layer 151 and the second ferromagnetic layer 152 by exchange-coupling the first ferromagnetic layer 151 and the second ferromagnetic layer 152 so as to magnetize those layers 151 and 152 in anti-parallel to each other, thereby controlling the practical amount of magnetization of the ferromagnetic pinned layer to a difference of the magnetization amount between the layers 151 and 152.

Although the ferromagnetic pinned layer 15 may be formed with any of a single layer magnetic material and a layered film consisting of two or more than four layers without running counter to the spirit of the present invention, the configuration shown in FIG. 1 is effective to obtain favorite waveform symmetry for enabling minute magnetic sensors to be used substantially.

The soft magnetic free layer 13 may be formed with any of a single layer magnetic material and a layered film consisting of two or more layers (not shown in FIG. 1). Even so, those layers are regarded as a united one magnetically. Therefore, the layer 13 is not against the spirit of the present invention. Particularly, if Co or a Co alloy is used to form the portion of the layer 13, which is closer to the non-magnetic intermediate layer 12 while an NiFe alloy is used to form the opposite portion of the layer 13, both of a soft magnetic characteristic and a high MR ratio can be satisfied.

The soft magnetic free layer 13 of the magnetoresistive layered film 10, the soft magnetic anti-parallel layer 132 and the domain-stabilization ferromagnetic layer 45 that are layered on the soft magnetic free layer 13 are formed almost in the same size in the track width direction. The domain-stabilization ferromagnetic layer 45 consists of a ferromagnetic layer 412 and an antiferromagnetic film 413. The ferromagnetic layer 412 is disposed in contact with the anti-parallel coupling layer 416.

The anti-parallel coupling layer 411 causes magnetic exchange coupling between the soft magnetic free layer 13 and the soft magnetic anti-parallel layer 132 to enable the soft magnetic free layer 13 and the soft magnetic anti-parallel layer 132 to be coupled in an antiferromagnetic manner, that is, to be magnetized in anti-parallel to each other. The anti-parallel coupling layer 411 may be an Ru 0.4-nm or 0.8-nm layer. By selecting both material and thickness properly, the antiferromagnetic interlayer coupling between the soft magnetic free layer 13 and the soft magnetic anti-parallel layer 132 is realized through the anti-parallel coupling layer 411 so as to become as strong as a few kilo-Oersteds.

The weak anti-parallel coupling layer 416 causes weak magnetic exchange coupling between the soft magnetic anti-parallel layer 132 and the domain-stabilization ferromagnetic layer 45 to enable both of the soft magnetic anti-parallel layer 132 and domain-stabilization ferromagnetic layer 45 to be coupled in a weak magnetic manner, that is, to be magnetized in anti-parallel to each other when the magnetic field value is zero. The weak anti-parallel coupling layer 416 may be a layered film formed by depositing a 0.4-nm Cu layer on a 0.8-nm Ru layer to enable controllable antiferromagnetic exchange coupling between the soft magnetic anti-parallel layer 132 and the domain-stabilization ferromagnetic layer 45. The weak anti-parallel coupling layer 416 may also be formed with a material that causes no in-plane magnetic exchange coupling such as a Ta 1-nm layer to enable controllable weak anti-parallel magnetic coupling between the soft magnetic anti-parallel layer 132 and the domain-stabilization ferromagnetic layer 45 if the amount of magnetization is set in a proper balance among the soft magnetic free layer 13, the soft magnetic anti-parallel layer 132, and the domain-stabilization ferromagnetic layer 45.

A proper value can be set for coupling the soft magnetic anti-parallel layer 132 and the domain-stabilization ferromagnetic layer 45 with each other through the weak anti-parallel coupling layer 416 in an antiferromagnetic manner with respect to the magnetic field to be perceived by selecting both material thickness and sensor size properly. The proper value with respect to the magnetic field to be perceived mentioned here means a sensor value that is small to sense the magnetic field to be perceived while it is large enough to obtain the stability of the magnetic head. In the current hard disk drive, the value can be considered to be a few tens to a few hundreds of Oersteds.

The antiferromagnetic film 413 is magnetized in the track width direction approximately perpendicular to the magnetic field to be perceived and enables magnetization of the ferromagnetic layer 412 in the track width direction when the magnetic field to be perceived is zero by that a bias of exchange coupling is applied to the ferromagnetic layer 412. Because of such a function of the film 413, a desired magnetic charge is generated at the end of the domain-stabilization ferromagnetic layer 45. The soft magnetic anti-parallel layer 132 and the domain-stabilization ferromagnetic layer 45 are laminated on the soft magnetic free layer 13 of the magnetoresistive layered film 10 and disposed at a predetermined amount of magnetization respectively almost in the same size in the track width direction, whereby the ferromagnetic layer 412 and the soft magnetic anti-parallel layer 132, as well as the soft magnetic anti-parallel layer 132 and the soft magnetic free layer 13, are magnetized in anti-parallel to each other, respectively. As a result, double closed flux paths coupled static-magnetically at the end of the track width direction are formed, thereby stabilizing the domain of a portion for sensing the magnetic field of an object magnetic sensor, that is, the soft magnetic free layer 13. If the distance between the soft magnetic free layer 13 and the end portion of the ferromagnetic layer 412 is short enough, the difference of the amount of magnetization between the soft anti-parallel layer 132 and the soft magnetic free layer 13 may be almost identical to the amount of magnetization of the ferromagnetic layer 412. If the distance is long, the amount of magnetization of the ferromagnetic layer 412 should be set larger than the difference of the amount of magnetization between the soft magnetic anti-parallel layer 132 and the soft magnetic free layer 13 by taking into consideration the loss to be expected until reaching the soft magnetic free layer 13 and the soft magnetic anti-parallel layer 132. Concretely, the amount of magnetization may increase by 0.2 to 0.5 times the initial one. However, such an increase of the amount of magnetization causes an increase of the load for pinning the magnetization of the domain-stabilization ferromagnetic layer 45. The increase should therefore be minimized.

As shown with an arrow in FIG. 1, the soft magnetic free layer 13, the soft magnetic anti-parallel layer 132, and the domain-stabilization ferromagnetic layer 45 are magnetized in anti-parallel to each other. When the value of the magnetic field to be perceived is zero, they are magnetized approximately in the track width direction. In other words, the magnetic anisotropy, the detection current amount, the magnetization amount of the ferromagnetic pinned layer 15, the sensor height that is the sensor depth, etc., may be fine-adjusted so as to symmetrize the read sensor bias characteristics.

The interval between the upper and lower magnetic shields provided at both sides of the sensor in the track width direction should be narrower than the read gap 43 to realize a so-called side shield structure that can suppress the side reading of the magnetic field to be perceived. However, the spirit of the present invention will not be lost even when the interval between the upper and lower magnetic shields provided at both sides of the sensor in the track width direction is not narrower than the read gap 43.

Figure 2:
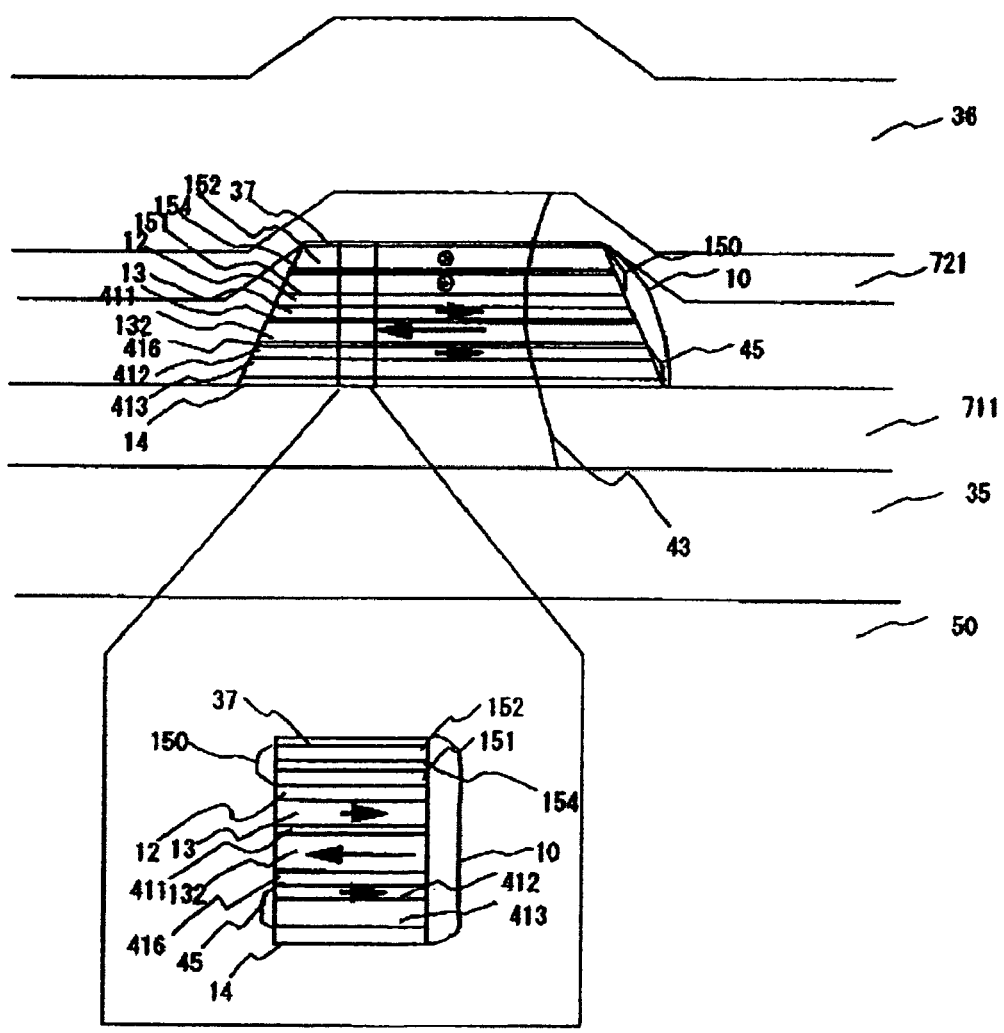
FIG. 2 is another configuration of the magnetoresistive head according to an embodiment of the present invention.

FIG. 2 is a configuration of the magnetoresistive head according to another embodiment of the present invention. FIG. 2 is an explanatory view of the magnetic head from the air bearing surface to the magnetic medium. On a substrate 50 are formed a lower magnetic shield 35 and a lower conductive gap film 711, then a magnetoresistive layered film 10 is formed thereon. After that, an upper conductive gap film 721 and an upper magnetic shield 36 are formed on the magnetoresistive layered film 10, whereby a read gap 43 for detecting read signals is formed. Many parts of the magnetic head shown in FIG. 2 are common to those shown in FIG. 1, so that only the different parts from those shown in FIG. 1 will be described here in detail.

The magnetoresistive layered film 10 is composed of an underlayer 14, a domain-stabilization ferromagnetic layer 45, a weak anti-parallel coupling layer 416, a soft magnetic anti-parallel layer 132, an anti-parallel coupling layer 411, a soft magnetic free layer 13, a non-magnetic intermediate layer 12, a hard magnetic pinned layer 150, and a protection film 37 that are formed consecutively thereon. In this configuration, the hard magnetic pinned layer 150 is formed as a layered film consisting of a first ferromagnetic layer 151, a second ferromagnetic layer 152, and an anti-parallel coupling layer 154. The anti-parallel coupling layer 154 is effective to control an actual amount of magnetization of the ferromagnetic pinned layer to a difference of the magnetization amount between the first ferromagnetic layer 151 and the second ferromagnetic layer 152 by applying a bias of exchange coupling to the first ferromagnetic layer 151 and the second ferromagnetic layer 152 so that they are magnetized in anti-parallel to each other. Although the ferromagnetic pinned layer 150 may be formed with any of a single layer magnetic material and a layered film consisting of two or more than four layers without running counter to the spirit of the present invention, the amounts of magnetization in the first ferromagnetic layer 151 and the second ferromagnetic layer 152, that is, the product of the magnetic flux density and the film thickness, is set identical between the first ferromagnetic layer 151 and the second ferromagnetic layer 152, thereby stabilizing the magnetization with respect to the object external magnetic field. Therefore, unlike the configuration shown in FIG. 1, which uses antiferromagnetic films, the configuration shown in FIG. 2 that uses no antiferromagnetic film can obtain high and stable outputs.

The functions and operations of the domain-stabilization ferromagnetic layer 45, the anti-parallel coupling layer 411, the soft magnetic free layer 13, the soft magnetic anti-parallel layer 132, and the weak anti-parallel coupling layer 416 are all the same as those shown in FIG. 1. They are formed almost in the same size in the track width direction, so that the domain-stabilization ferromagnetic layer 45 and the soft magnetic anti-parallel layer 132, as well as the soft magnetic anti-parallel layer 132 and the soft magnetic free layer 13, are magnetized in anti-parallel to each other respectively, whereby double closed flux paths coupled static-magnetically are formed at the end of the track width direction for single domain-stabilization of the soft magnetic free layer 13.

Figure 3:
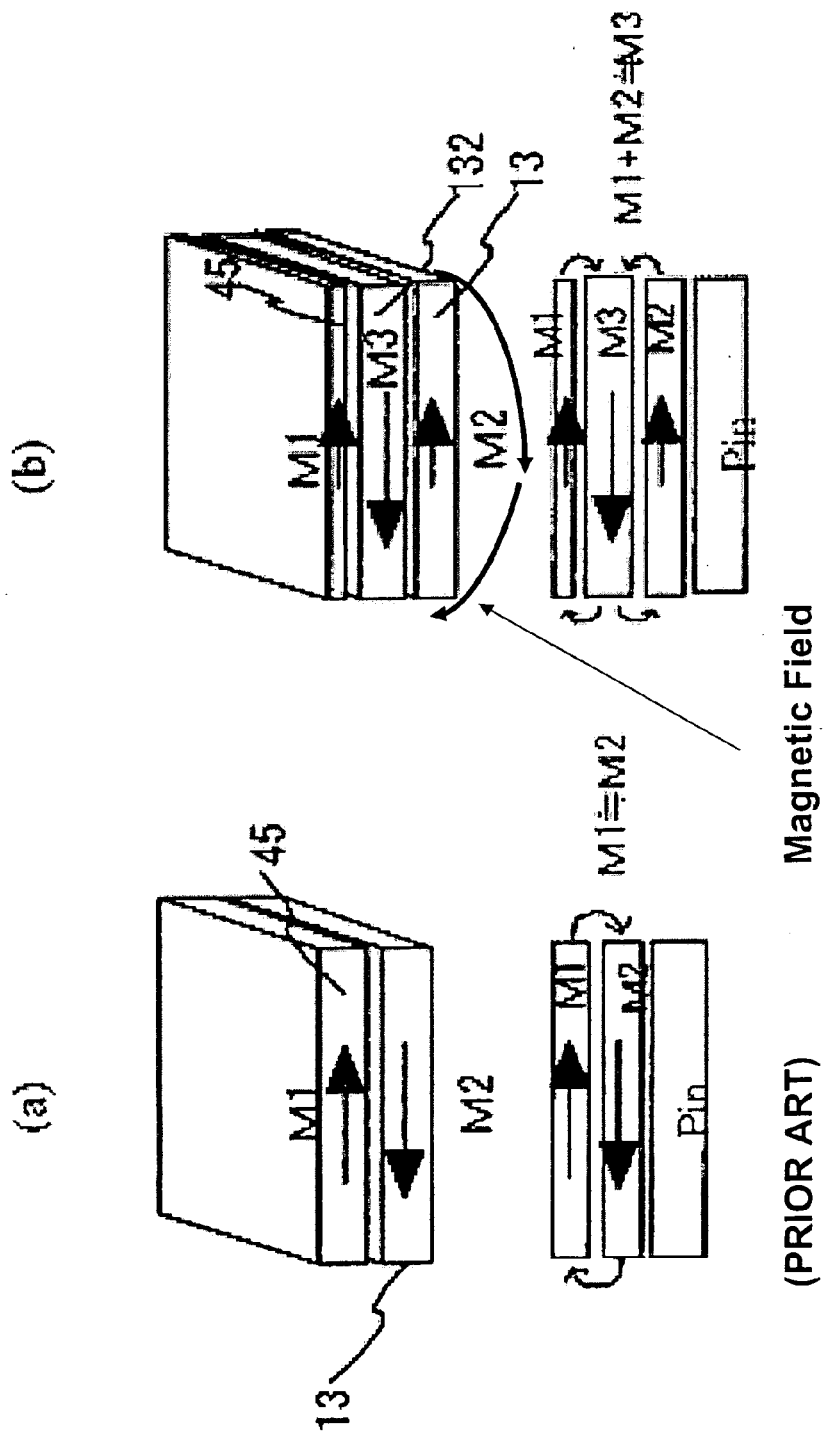
FIG. 3(a) is a schematic diagram of a conventional in-stack type domain control structure.
FIG. 3(b) is a schematic diagram of an in-stack type domain control structure according to an embodiment of the present invention.

FIG. 3 illustrates both principle and configuration of the domain control of the magnetoresistive magnetic head of the present invention. FIG. 3(a) shows the in-stack type domain control of the prior art while FIG. 3(b) shows the in-stack type domain control of the present invention for double closed flux paths.

The prior art in-stack type domain control structure has a soft magnetic free layer 13 and a domain-stabilization ferromagnetic layer 45. If the amounts of magnetization in the layers 13 and 45 are defined as M1 and M2, the magnetic head is manufactured so that M1 and M2 become almost equal. This is because the soft magnetic free layer 13 and the domain-stabilization ferromagnetic layer 45 are magnetized in anti-parallel to each other as shown in FIG. 3(a) (in the lower illustration), so that one closed flux path is formed static-magnetically at the end portion, whereby the value of M1−M2 is set as almost zero. Concretely, if a large difference occurs between M1 and M2, a magnetic charge as much as the |M1−M2| is generated at the end, whereby the soft magnetic free layer 13 and the domain-stabilization ferromagnetic layer 45 are magnetized off the predetermined direction, particularly at the end portion. The amount of magnetization mentioned here may be taken as a value of magnetic flux density×thickness of a magnetic film.

On the other hand, in the in-stack type domain control structure of the present invention shown in FIG. 3(b), the soft magnetic free layer 13 and the domain-stabilization ferromagnetic layer 45 are magnetized in forward parallel to each other and the soft magnetic anti-parallel layer 132 disposed in the center between those layers 13 and 45 is magnetized in anti-parallel to the soft magnetic free layer 13 and the domain-stabilization ferromagnetic layer 45 respectively. As a result, as shown at the bottom of FIG. 3(b), the magnetic charges at the ends of the soft magnetic free layer 13 and the soft magnetic anti-parallel layer 132, as well as those of the soft magnetic anti-parallel layer 132 and the domain-stabilization ferromagnetic layer 45 cancel each other to form a closed flux path respectively, whereby double closed flux paths are formed in all. The relationship among the amounts of magnetization for forming those double closed flux paths becomes so that M1+M2 is almost equal to M3. Although it is similar to the case of prior art, unless |M1+M2−M3| is zero, a magnetic charge is generated at the end and the soft magnetic free layer 13, the soft magnetic anti-parallel layer 132, and the domain-stabilization ferromagnetic layer 45 are magnetized off the desired direction due to the demagnetization. Nevertheless, the structure of the present invention has an important advantage that extends the range of the Ml, M2, M3 values wider than that of prior art.

Figure 4:
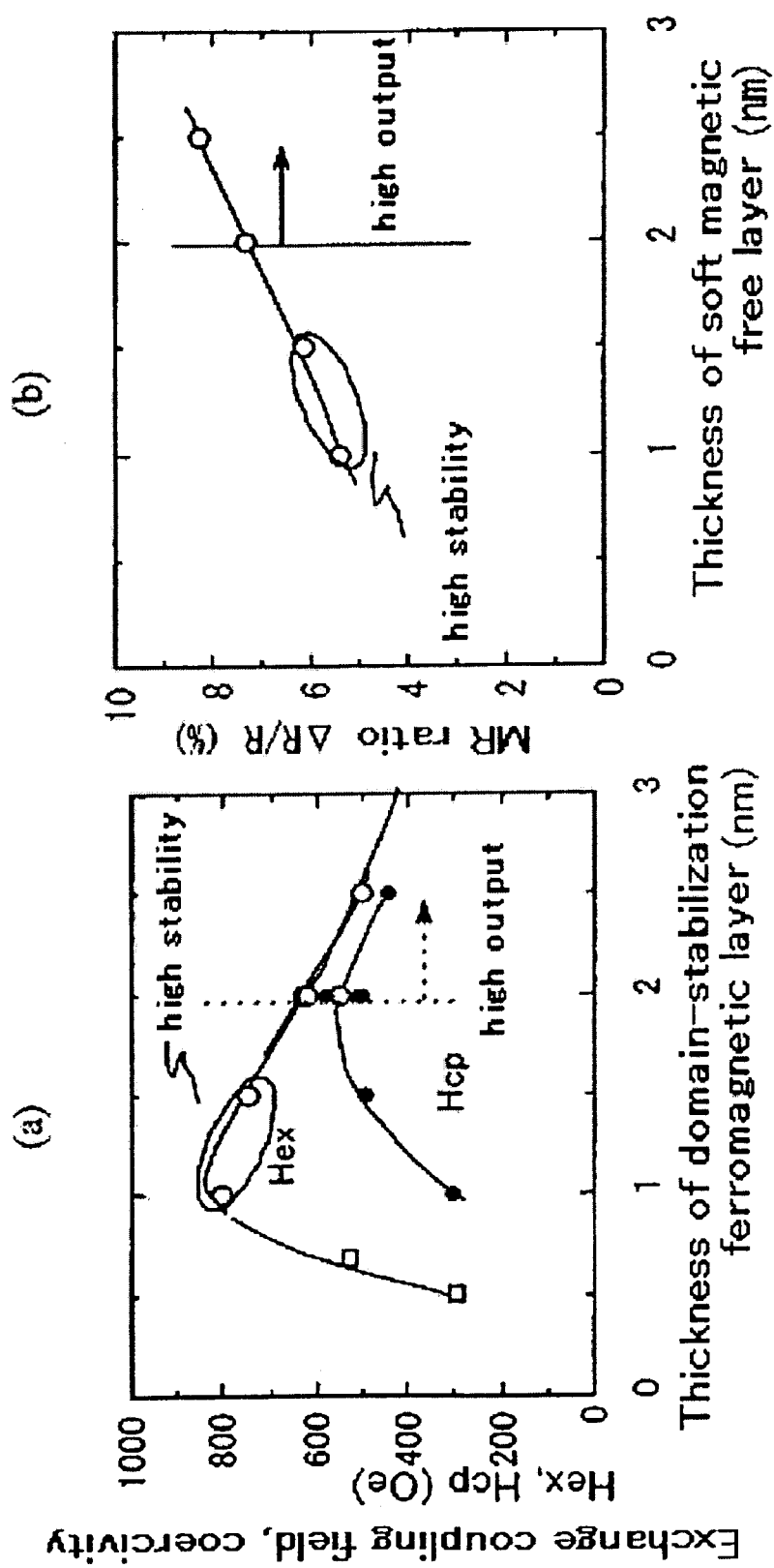
FIG. 4 is graphs for describing the properties of a magnetoresistive layered film structure of the prior art.

FIG. 4 illustrates characteristics of a magnetic layer thickness and a magnetoresistive layered film shown in a relationship between them with respect to the structure of the domain-stabilization layer of the prior art. In order to simplify the description, the test is performed for the giant magnetoresistance in an in-plane current that is employed most frequently.

The structure denoted here as a prior art example 1 will be as follows; substrate/$Ni_{56}Fe_{14}Cr_{30}$ underlayer 4 nm/$Mn_{52}Pt_{48}$ antiferromagnetic film 15 nm/$Co_{90}Fe_{10}$ ferromagnetic pinned layer 2 nm/Ru anti-parallel coupling layer 0.8 nm/$Co_{90}Fe_{10}$ ferromagnetic pinned layer 3 nm/Cu intermediate layer 2 nm/$Co_{90}Fe_{10}$ soft magnetic free layer ($t_{free}$)/Cu/Ru weak anti-parallel coupling layer 1.2 nm/$Co_{90}Fe_{10}$ ferromagnetic layer ($t_{dc}$)/$Mn_{52}Pt_{48}$ antiferromagnetic film 15 nm/Ta protection film 1 nm. However, another structure consisting of substrate/$Ni_{56}Fe_{14}Cr_{30}$ underlayer 4 nm/Cu/$Co_{90}Fe_{10}$ ferromagnetic layer ($t_{dc}$)/$Mn_{52}Pt_{48}$ antiferromagnetic film 15 nm/Ta protection layer 1 nm, which is part of the above one, is used for measuring the exchange coupling magnetic field Hex and the coercivity Hcp so as to prevent the magnetic influence from the anti-parallel coupling layer.

FIG. 4(a) is a check result of the thickness ($t_{DC}$) of the domain-stabilization ferromagnetic layer and the exchange coupling magnetic field Hex to be applied to a ferromagnetic layer of the domain-stabilization ferromagnetic layer by an antiferromagnetic film. If the domain-stabilization ferromagnetic layer is thinned from 3 nm up to 1 nm, the exchange coupling magnetic field increases step by step, and accordingly the coercivity Hcp increases to its peak, then falls. If the thickness of the domain-stabilization ferromagnetic layer is further thinned, the exchange coupling magnetic field and the coercivity Hcp falls until the layer cannot function as a domain-stabilization ferromagnetic layer any longer. Consequently, if the domain-stabilization ferromagnetic layer is reduced in thickness up to 1 to 1.5 nm, the domain-stabilization ferromagnetic layer can be magnetized most strongly in the desired state.

On the other hand, FIG. 4(b) illustrates a relationship between the thickness ($t_{free}$) of the soft magnetic free layer and the MR ratio. The thickness ($t_{DC}$) of the domain-stabilization ferromagnetic layer and the thickness of the soft magnetic free layer ($t_{free}$) are the same. As illustrated, as the thickness of the soft magnetic free layer is reduced under 3 nm, the MR ratio falls. And, it is also understood that the thickness of the soft magnetic free layer is minimized to realize high read performance and high output, concretely up to 2 nm and over.

In that connection, the prior art in-stack type domain control structure, as shown in FIG. 3A, is required to make it equal the amount of magnetization between the domain-stabilization ferromagnetic layer and the soft magnetic free layer. In FIGS. 4(a) and 4(b), about 1.8-tesra CoFe alloy is used for both of the domain-stabilization ferromagnetic layer and the soft magnetic free layer, so that the thickness between those layers must be adjusted to the same when the amount of magnetization is matched between them. However, as shown in FIG. 4(a) and FIG. 4(b) clearly, when the thickness of the domain-stabilization ferromagnetic layer is 1 to 1.5 nm, the performance of the domain-stabilization ferromagnetic layer is improved. If the in-stack type domain control method of the prior art is employed, however, it is only possible to use a magnetic head having a film thickness of a low MR ratio and a high exchange coupling magnetic field or magnetic head having a high MR ratio and a low exchange coupling magnetic field. Note that FIG. 4(b) shows an example in which the MR ratio falls with respect to the CIP-GMR and this is considered to be similar when magnetoresistive sensors configured differently such as TMR and CPP-GMR are used. For example, as described in "Output enhancement of spin-valve giant magnetoresistance in current-perpendicular-to-plane geometry" in JOURNAL OF APPLIED PHYSICS VOLUME 92, 2646-2650 (2002), if the magnetic film is thin as shown in FIG. 4B, the MR ratio decreases in CPP-GMR. Consequently, the difficulty for satisfying the requirements of the exchange coupling of the domain-stabilization ferromagnetic layer and the magnetoresistance are a common problem in various magnetoresistive sensors.

A read output fall is a problem that might occur if a magnetic head is configured with a low MR ratio; in that case, the magnetic head cannot obtain high performance. However, the magnetic head configuration according to embodiments of the present invention can obtain such high performance while achieving the domain control performance equally to that of the prior art.

Figure 5:
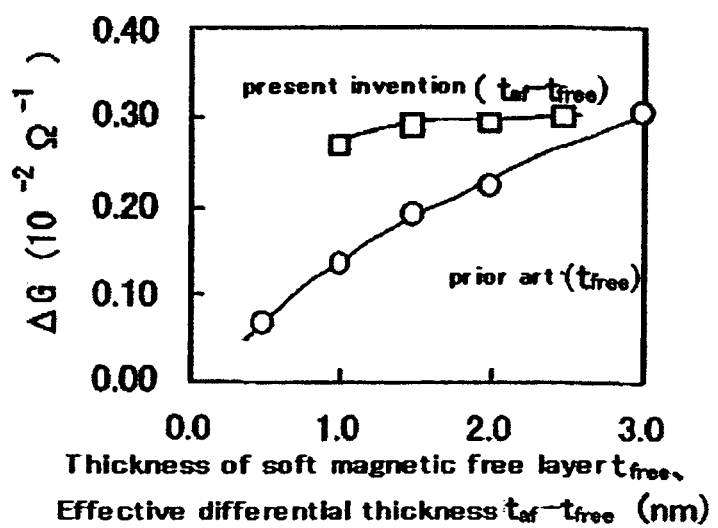
FIG. 5 is another graph for describing the characteristics of the magnetoresistive layered film structures of the prior art and the present invention.

FIG. 5 shows a graph for describing a result of comparison of the magnetoresistance between the configuration of the prior art and the configuration according to embodiments of the present invention. In FIG. 5, a conductance change ΔG is used as an evaluation factor. The use of this index makes it possible to neglect the difference of current efficiency between thin film configurations, whereby the size of the magnetoresistance can be compared more theoretically. The result of the prior art technique shown in FIG. 5 is obtained from the structure shown in the prior art example 1. On the other hand, the example 1 of the present invention is configured by substrate/$Ni_{56}Fe_4Cr_{30}$ underlayer 4 nm/$Mn_{52}Pt_{48}$ antiferromagnetic film 15 nm/$Co_{90}Fe_{10}$ ferromagnetic pinned layer 3 nm/Ru anti-parallel coupling layer 0.8 nm/$Co_{90}Fe_{10}$ ferromagnetic pinned layer 3 nm/Cu intermediate layer 2 nm/$Co_{90}Fe_{10}$ soft magnetic free layer ($t_{free}$)/Ru anti-parallel coupling layer 0.8 nm/$Co_{90}Fe_{10}$ anti-parallel soft magnetic layer 4 nm/Cu/Ru weak anti-parallel coupling layer 1.2 nm/$Co_{90}Fe_{10}$ ferromagnetic layer ($t_{DC}$)/$Mn_{52}Pt_{48}$ antiferromagnetic film 15 nm/Ta protection layer 1 nm. Because of this configuration, the portion of the $Co_{90}Fe_{10}$ soft magnetic free layer ($t_{free}$)/Ru anti-parallel coupling layer 0.8 nm/$Co_{90}Fe_{10}$ soft magnetic anti-parallel layer $t_{af}$=4 nm is magnetized in anti-parallel to each another, so that those layers are actually magnetized as a united soft magnetic layer.

From the viewpoint of the magnetic head, the practical amount of magnetization or thickness of the free layer should be used to make a comparison between techniques of the prior art and the present invention. In FIG. 5, therefore, the prior art technique uses the horizontal axis to denote the thickness $t_{free}$ of the soft magnetic free layer while the present invention technique uses the horizontal axis to denote a difference between the thickness of the soft magnetic anti-parallel layer and that of the soft magnetic free layer, that is, an effective difference of thickness $t_{af}$-$t_{free}$. As shown clearly in FIG. 5, in the configuration of the prior art, if the CoFe layer used as a magnetic layer is reduced in thickness, the ΔG value decreases. Consequently, if an in-stack type domain control film is reduced in thickness, the magnetoresistance falls just like the case in FIG. 4. On the other hand, in the configuration according to embodiments of the present invention, the in-stack type domain control is realized by employing the soft magnetic anti-parallel layer, and its difference of magnetic thickness is set to be equal to the magnetic thickness of the prior art. Consequently, the reduction of magnetoresistance becomes almost zero even when the difference from the previous thickness of the magnetic film decreases.

Figure 6:
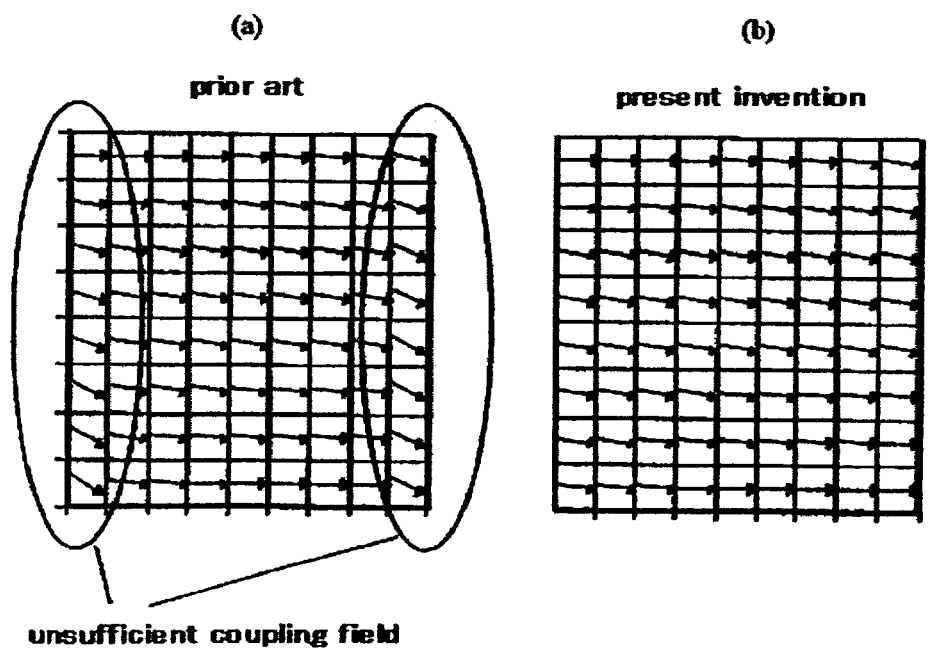
FIG. 6 is calculation results of magnetization states of the domain-stabilization magnetic layers of the prior art and the present invention.

On the contrary, if the magnetic head is configured so as to increase the magnetoresistance and have low exchange coupling in the prior art technique, a problem arises as shown in FIG. 6. FIG. 6 shows results of computer simulations for a magnetization alignments of domain-stabilization ferromagnetic layer in the in-stack type domain control structures of the prior art technique and the present invention technique. The simulation uses a magnetic head corresponding to high recording density at a track width of 50 nm and at a read gap of 30 nm.

In the case of the prior art technique shown in FIG. 6(a), in which the exchange coupling magnetic field is low, the magnetization is disturbed by the low magnetic field at the end portion of the domain-stabilization ferromagnetic layer. This causes the layer to be bent from the right lateral direction. Because the track width is narrowed more to cope with high recording density, the demagnetizing field of the magnetic film becomes large and shorting of the exchange coupling field is influence. The magnetic head configuration according to an embodiment of the present invention can solve this problem. As shown in FIG. 3(b), in the double closed flux path structure of the present invention, the amount of magnetization can be balanced among three layers that are a domain-stabilization ferromagnetic layer, a soft magnetic free layer, and a newly added soft magnetic anti-parallel layer to set the amount of magnetization in each layer, that is, the thickness. For example, the domain-stabilization ferromagnetic layer can be set at 1 to 1.5 nm and the soft magnetic free layer can be set at 2 to 3 nm. In that connection, the soft magnetic anti-parallel layer may be set at M1+M2 in thickness optimally shown in FIG. 4, that is, simply 1.5+3=4.5 nm. From the simulation result of the magnetization state of the domain-stabilization ferromagnetic layer in the magnetic head configuration according to embodiments of the present invention shown in FIG. 6(b), it would be understood that the configuration according to embodiments of the present invention can suppress the edge magnetization bending. This is why the configuration according to embodiments of the present invention can realize the stabilized magnetization up to the end of the magnetic head formed more minutely.

Figure 7:
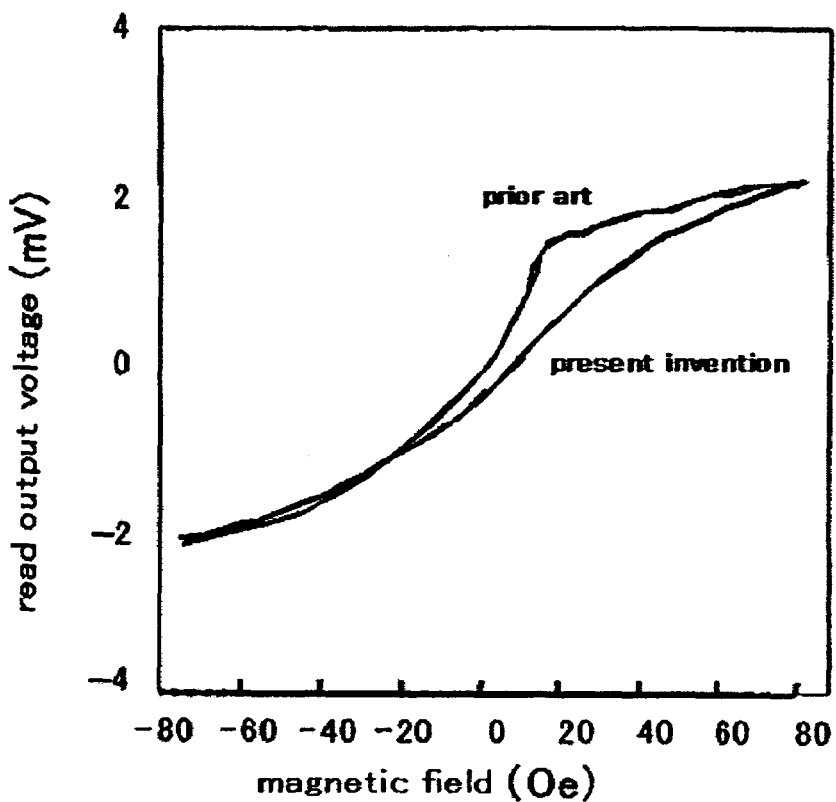
FIG. 7 is calculation results of the read outputs of the magnetoresistive sensors of the prior art and the present invention.

FIG. 7 shows a calculation result of the read output performances of the magnetic head in the above simulation. In the prior art technique, a curve is seen in accordance with the bending of the magnetization seen in FIG. 6(a) while the output of the configuration according to embodiments of the present invention appears linearly and consecutively to show favorable magnetic head performances.

Figure 8:
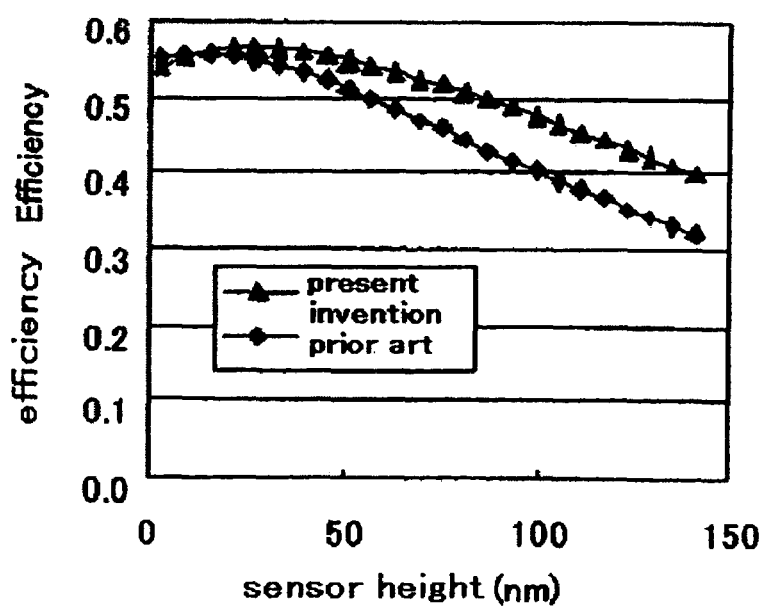
FIG. 8 is a graph for describing a relationship between the read efficiency and the sensor height of the magnetoresistive heads of the prior art and the present invention.

The sensor height dependency is checked in both of the configurations by the prior art technique and the present invention technique in the above simulation. FIG. 8 shows a relationship between the sensor height and the read efficiency in the in-stack domain control structures of the prior art and the present invention.

As described above, the sensor height means the length of the magnetoresistive sensor part from the air bearing surface of the read head with respect to the medium in its depth direction. The read efficiency in that case is an average value obtained from rotation angles of magnetization with respect to the magnetic field to be perceived in the soft magnetic free layer at a sensor height. The maximum rotation value is 1. If the rotation of magnetization with respect to the magnetic field to be perceived is zero, the read efficiency becomes zero. As shown clearly in FIG. 8, in both of the prior art and the present invention, if the sensor height exceeds 50 nm, the read efficiency comes to fall. This is because the magnetic field cannot go into the read gap easily, thereby the sensor's read efficiency comes to fall when the sensor height increases. However, it would be understood that the falling degree differs between the prior art and the present invention. When compared with the prior art technique, the magnetic head of the present invention keeps the read efficiency high with respect to an increase of the sensor height. This may be because the present invention uses the thicker soft magnetic free layer and the thicker domain control structure by employing a soft magnetic anti-parallel layer, whereby the increased exchange coupling in the soft magnetic free layer and the soft magnetic free layer attempts to rotate in uniform up to the sensor height.

There are two advantages of the present invention with larger sensor height; firstly, the manufacturing accuracy of the magnetic head sensor in the height direction, particularly the sensor height dependency is reduced to increase the height margin with respect to the processing accuracy, thereby, the magnetic head can be manufactured more easily. Secondly, the sensor height can increase, thereby the S/N ratio of the magnetic head is improved.

Figure 9:
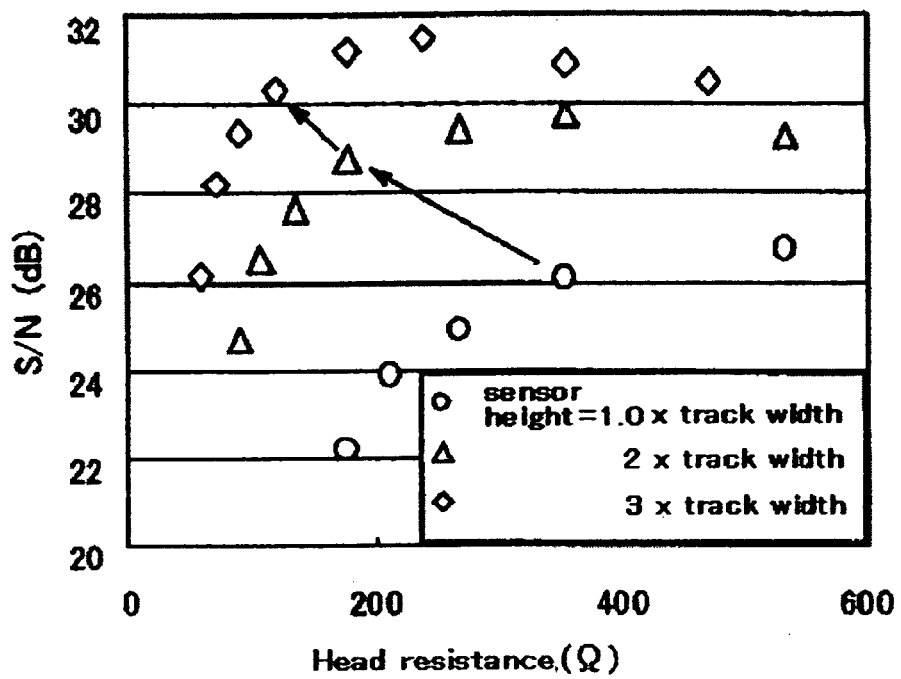
FIG. 9 is a graph for describing a relationship among the S/N, head resistance, and sensor height of the magnetoresistive heads of the prior art and the present invention.

FIG. 9 shows a relationship between the head S/N and the sensor height simulated for a tunneling magnetoresistive head. If the sensor height is set at one time, two times, and three times with respect to the track width, as denoted with an arrow in the figure respectively, the area of the read head sensor is proportional to the sensor height, and accordingly, when the sensor height increases, the read head resistance falls. If the sensor height increases, therefore, the noise is reduced, whereby the S/N increases even when a predetermined magnetoresistive film is used to drive the signals at the same voltage so as to fix the signal level.

Figure 10:
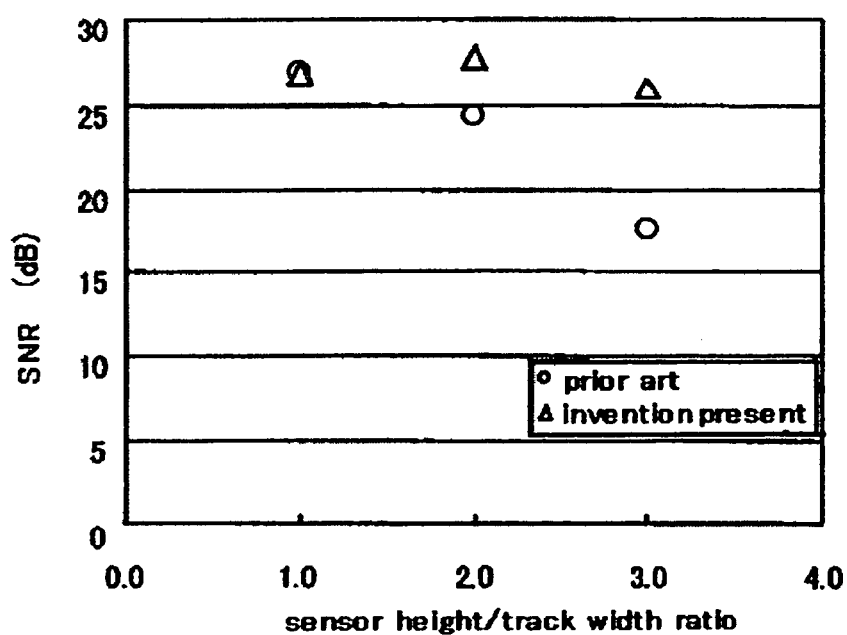
FIG. 10 is a graph for describing a relationship among the S/N and the sensor height/track width ratio of the magnetoresistive heads of the prior art and the present invention.

FIG. 10 shows a relationship between calculated values of the sensor height/track width ratio and the head S/N of the prior art and the present invention. In the configuration according to embodiments of the present invention, larger sensor height than track width is available without large reduction of read efficiency. The present invention can thus obtain a magnetoresistive head with a higher S/N value than the prior art.

Figure 11:
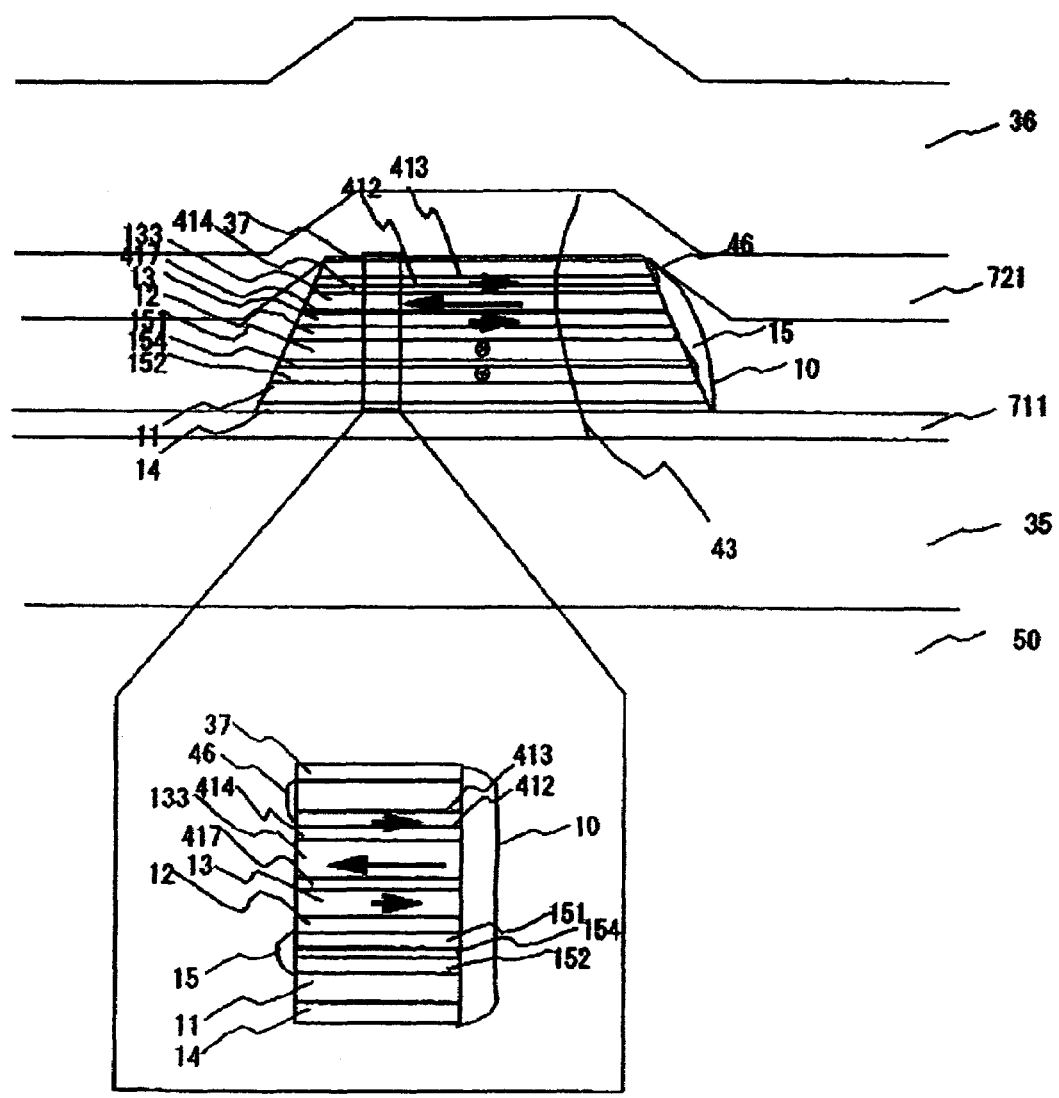
FIG. 11 is a configuration of the magnetoresistive head according to another embodiment of the present invention.

FIG. 11 shows a configuration of the magnetoresistive magnetic head according to another embodiment of the present invention. FIG. 11 is an explanatory view of the magnetic head from the air bearing surface of the head to the medium. In FIG. 11, on a substrate 50 are formed a lower magnetic shield 35 and a lower conductive gap film 711. Then, a magnetoresistive layered film 10 is formed on the surface and furthermore, an upper conductive gap film 721 and an upper magnetic shield 36 are formed on the surface, whereby a read gap 43 for detecting read signals is formed. Many parts of the structure are the same as those shown in FIG. 1, so that only the different parts from those shown in FIG. 1 will be described here in detail.

A magnetoresistive layered film 10 consists of an underlayer 14, an antiferromagnetic film 11, a ferromagnetic pinned layer 15, a non-magnetic intermediate layer 12, a soft magnetic free layer 13, a weak anti-parallel coupling layer 417, a soft magnetic anti-parallel layer 133, an anti-parallel coupling layer 414, a domain-stabilization ferromagnetic layer 46, and a protection film 37 that are formed consecutively in order.

In this structure, the domain-stabilization ferromagnetic layer 46 is a layered film consisting of a ferromagnetic film 412 and an antiferromagnetic film 413. The antiferromagnetic film 413 is exchange-coupled with the ferromagnetic film 412 and substantially pins the magnetization of the ferromagnetic film 412 effectively in the track width direction. The anti-parallel coupling layer 414 enables the ferromagnetic film 412 and the soft magnetic anti-parallel layer 133 to be exchange-coupled effectively so that they are magnetized in anti-parallel to each other to control the practical amount of magnetization of the domain-stabilization ferromagnetic layer 46 to a difference between the amounts of magnetization of the soft magnetic anti-parallel layer 133 and the ferromagnetic film 412. The weak anti-parallel coupling layer 417 enables the soft magnetic anti-parallel layer 133 and the soft magnetic free layer 13 to be magnetized effectively in weak anti-parallel to each other. Consequently, the ferromagnetic film 412, the soft magnetic anti-parallel layer 133, and the soft magnetic free layer 13 are formed almost in the same size in the track width direction and the ferromagnetic film 412 and the soft magnetic anti-parallel layer 132, as well as the soft magnetic anti-parallel layer 132 and the soft magnetic free layer 13, are magnetized in anti-parallel to each other respectively when the external magnetic field is zero and coupled static-magnetically at the end portion in the track width direction. In other words, double closed flux paths are formed to achieve single domain-stabilization of the soft magnetic free layer 13. The functions and operations of the ferromagnetic pinned layer 15 and the soft magnetic free layer 13 are the same as those shown in FIG. 1.

Hereunder, the second example of the present invention will be described. The second example is structured as follows; substrate/$Ni_{56}Fe_{14}Cr_{30}$ underlayer 4 nm/$Mn_{52}Pt_{48}$ antiferromagnetic film 15 nm/$Co_{90}Fe_{10}$ ferromagnetic pinned layer 3 nm/Ru anti-parallel coupling layer 0.8 nm/$Co_{90}Fe_{10}$ ferromagnetic pinned layer 3 nm/Cu intermediate layer 2 nm/$Co_{90}Fe_{10}$ soft magnetic free layer 2 nm/Cu/Ru weak anti-parallel coupling layer 1.2 nm/$Co_{90}Fe_{10}$ anti-parallel soft magnetic layer 3 nm/Ru anti-parallel coupling layer 0.8 nm/$Co_{90}Fe_{10}$ ferromagnetic layer 1 nm/$Mn_{52}Pt_{48}$ antiferromagnetic film 15 nm/Ta protection layer 1 nm.

Figure 12:
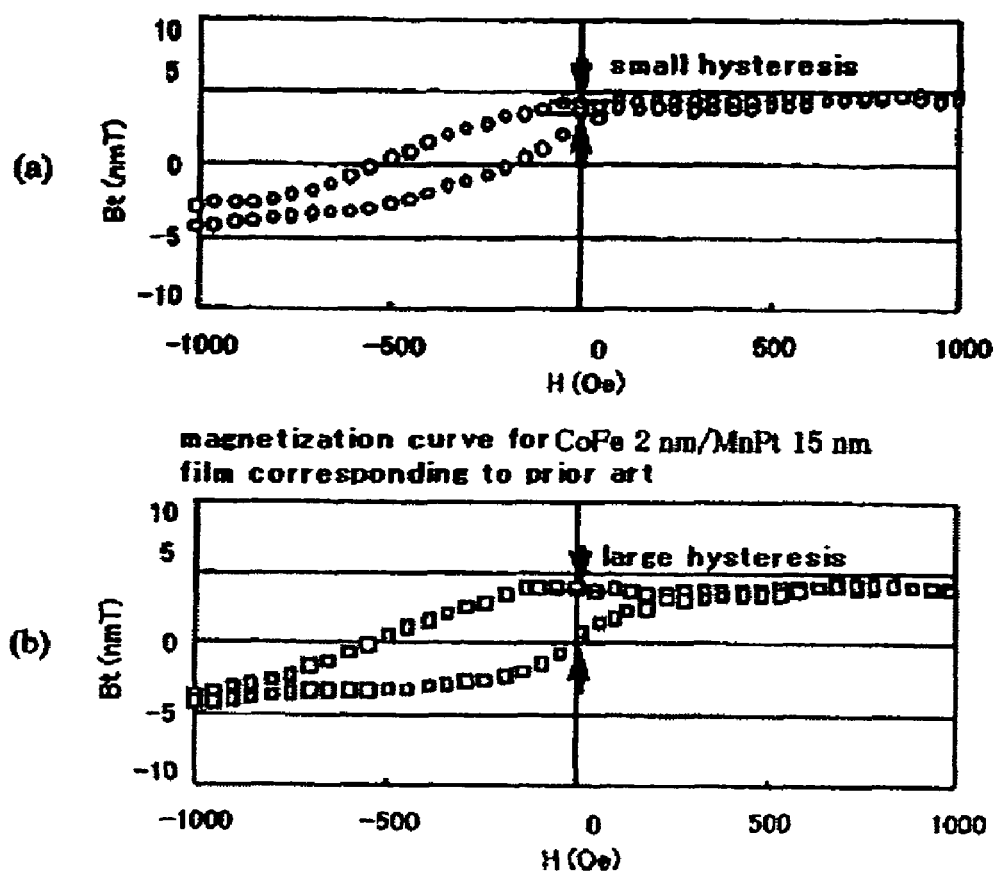
FIG. 12 is graphs for describing the properties of the domain-stabilization ferromagnetic layers of the prior art and the present invention.

FIG. 12 shows the magnetic properties of the portion consisting of the domain-stabilization ferromagnetic layer 46, the anti-parallel coupling layer 414, and the soft magnetic anti-parallel layer 133 in the configuration shown in FIG. 11. FIG. 12 also shows the magnetic properties of the domain-stabilization ferromagnetic layer of the prior art for the comparison with that in the prior art example 1. The layer consists of a ferromagnetic layer and an antiferromagnetic film.

FIG. 12(b) shows a typical magnetization curve for a CoFe/MnPt film that is the most popular material to be used for the configuration of the ferromagnetic layer/antiferromagnetic film of the prior art. As shown clearly in the figure, a large hysteresis is recognized in the magnetization curve of the prior art film and particularly, a plurality of magnetization states appear when the external magnetic field is zero. Such a hysteresis makes the magnetization unstable, whereby the domain control structure function is degraded significantly. On the contrary, it would be understood that such a hysteresis is reduced enough in the magnetization curve of the present invention example 2 shown in FIG. 12(a). Such a magnetization state with less hysteresis is just obtained with use of a layered configuration of the present invention and by proper controlling of the distribution of the magnetization amount of the magnetic film and the mutual coupling strength. More concretely, such a magnetization state is realized with use of a material for controlling the distribution of the magnetic film thickness and the coupling strength of the anti-parallel coupling layer, as well as the techniques for controlling interface composition and crystallization. Those techniques are used to improve the magnetic properties, thereby realizing stable domain control as shown clearly in FIG. 12.

Figure 13:
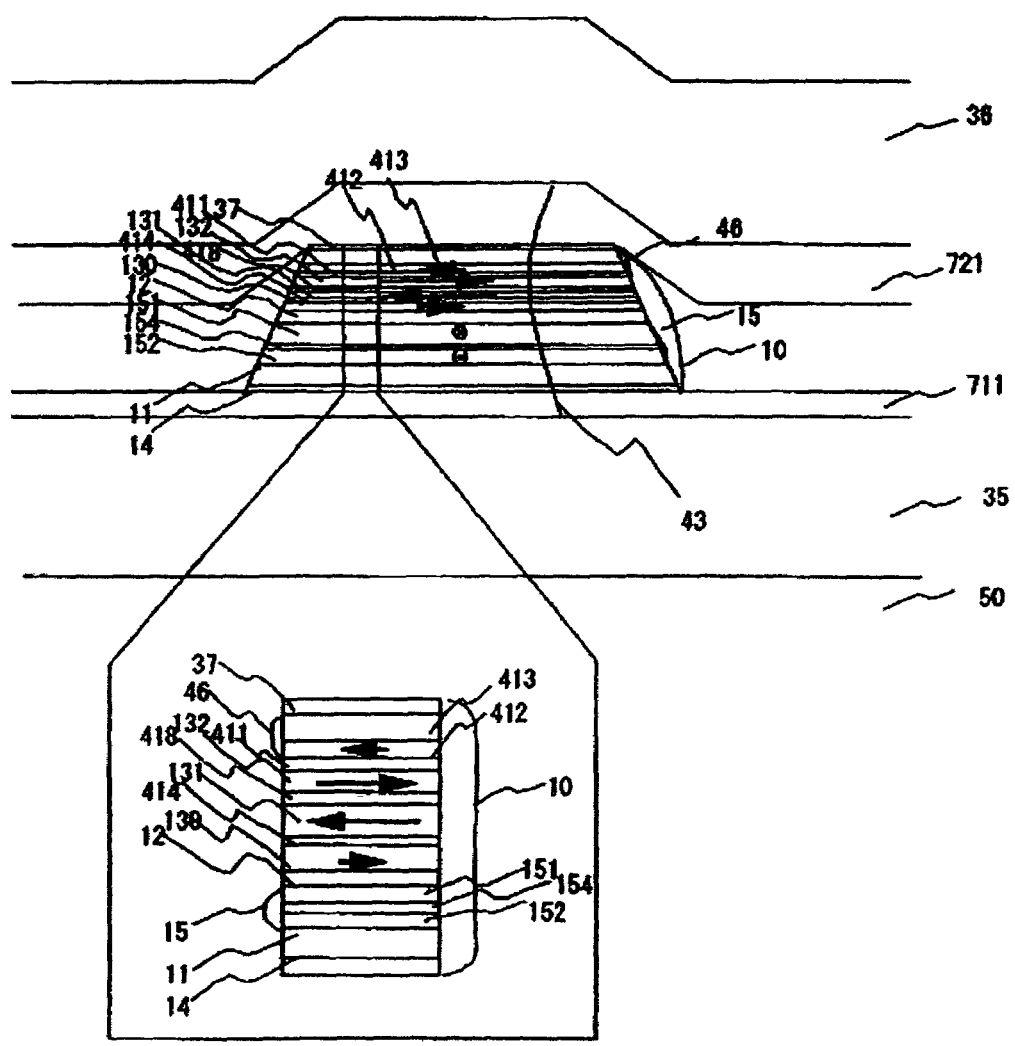
FIG. 13 is a configuration of the magnetoresistive head according to another embodiment of the present invention.

FIG. 13 is an expanded example of the configuration of the magnetoresistive head of the present invention, that is, an explanatory view of the magnetic head from the air bearing surface facing the magnetic medium. In this example, the magnetic head employs a triple closed flux path structure consisting of four magnetic layers. At first, on a substrate 50 are formed a lower magnetic shield 35 and a lower conductive gap film 711, then a magnetoresistive layered film 10 is formed on the surface. Furthermore, an upper conductive gap film 721 and an upper magnetic shield 36 are formed on the surface, thereby a read gap 43 for detecting read signals is formed. Many parts shown in FIG. 13 are the same as those shown in FIG. 1, so that only the different parts from those shown in FIG. 1 will be described here in detail.

The magnetoresistive layered film 10 consists of an underlayer 14, an antiferromagnetic film 11, a ferromagnetic pinned layer 15, a non-magnetic intermediate layer 12, a soft magnetic free layer 130, an anti-parallel coupling layer 414, a soft magnetic anti-parallel layer 131, a weak anti-parallel coupling layer 418, a soft magnetic anti-parallel layer 132, an anti-parallel coupling layer 411, a domain-stabilization ferromagnetic layer 46, and a protection film 37 that are formed consecutively in order.

In this example, the soft magnetic free layer 130 is configured and disposed through the anti-parallel coupling layer 414 so as to magnetize the soft magnetic anti-parallel layer 131 and itself in anti-parallel to each other substantially, whereby both of the soft magnetic free layer 130 and soft magnetic anti-parallel layer 131 are magnetized as a united soft magnetic free layer substantially. The amounts of magnetization of the layers 130 and 131 are set so as to generate a differential value between them. In this example, the domain-stabilization ferromagnetic layer 46 is also formed as a layered one consisting of a ferromagnetic film 412 and an antiferromagnetic film 413. The antiferromagnetic film 413 is exchange-coupled with the ferromagnetic film 412 to pin the magnetization of the ferromagnetic film 412 substantially in the track width direction. In addition, the anti-parallel coupling film 411 applies a bias of exchange-coupling to the ferromagnetic layer 412 and the soft magnetic anti-parallel layer 132 so that those layers 412 and 132 are magnetized in anti-parallel to each other and enables the domain-stabilization ferromagnetic layer 46 and the soft magnetic anti-parallel layer 132 to function substantially just like a united magnetic film, and controls the amounts of magnetization in those portions to a difference between the magnetization amounts of the soft magnetic anti-parallel layer 132 and the ferromagnetic layer 412. The amounts of magnetization in both of the ferromagnetic layer 412 and the soft magnetic anti-parallel layer 132 are set so as to generate a proper difference between them. The difference between those magnetization amounts is adjusted to almost equally to the difference between the soft magnetic free layer 130 and the soft magnetic anti-parallel layer 131 to stabilize the closed flux path structure. The weak anti-parallel coupling layer 418 magnetizes the soft magnetic anti-parallel layer 132 and the soft magnetic anti-parallel layer 131 effectively in weak anti-parallel to each other.

Consequently, the ferromagnetic layer 412, the soft magnetic anti-parallel layer 132, the soft magnetic anti-parallel layer 131, and the soft magnetic free layer 130 are formed almost in the same size in the track width direction. The ferromagnetic layer 412 and the soft magnetic anti-parallel layer 132, the soft magnetic anti-parallel layer 131 and the soft magnetic free layer 130, and the soft magnetic anti-parallel layer 132 and the soft magnetic anti-parallel layer 131 are magnetized in anti-parallel to each other, respectively, when the external magnetic field is zero. And, those layers are coupled static-magnetically at the end of the track width direction to form triple closed flux paths to stabilize the domain of the soft magnetic free layer 130.

Figure 14:
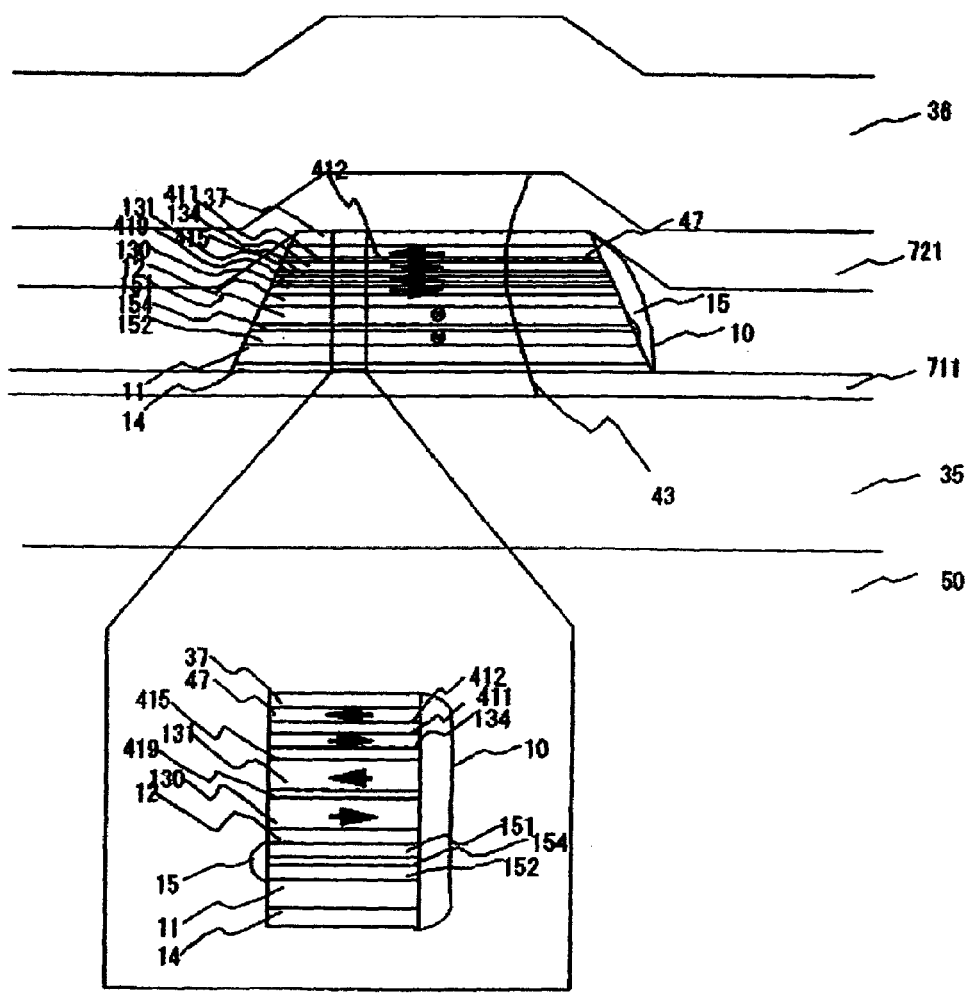
FIG. 14 is a configuration of the magnetoresistive head according to another embodiment of the present invention.

FIG. 14 is another expanded example of the configuration of the magnetoresistive head of the present invention, which is an explanatory view of the magnetoresistive head from the air bearing surface facing the magnetic medium. In this example, the magnetoresistive head employs a double closed flux path structure consisting of four magnetic layers. In this example, a high coercivity layered film is used for the domain control part. On a substrate 50 are formed a lower magnetic shield 35 and a lower conductive gap film 711, then a magnetoresistive layered film 10 is formed on the surface. Furthermore, an upper conductive gap film 721 and an upper magnetic shield 36 are formed on the surface, whereby a read gap 43 for detecting read signals are formed. Many parts shown in FIG. 14 are the same as those shown in FIG. 1, so that only the different parts from those shown in FIG. 1 will be described here in detail.

The magnetoresistive layered film 10 shown in FIG. 14 consists of an underlayer 14, an antiferromagnetic film 11, a ferromagnetic pinned layer 15, a non-magnetic intermediate layer 12, a soft magnetic free layer 130, a weak anti-parallel coupling layer 419, a soft magnetic anti-parallel layer 131, a weak anti-parallel coupling layer 415, a ferromagnetic anti-parallel lower 134, an anti-parallel coupling layer 411, and a domain-stabilization ferromagnetic layer 47 that are formed consecutively in order.

In this example, the soft magnetic free layer 130 and the soft magnetic anti-parallel layer 131 are coupled through the weak anti-parallel coupling layer 419 and magnetized in weak anti-parallel to each other. The amount of magnetization is set for both of the soft magnetic free layer 130 and the soft magnetic anti-parallel layer 131 so that the difference between those amounts becomes zero substantially. This is to form one closed flux path coupled magnetically at the end portion in the track width direction when the soft magnetic free layer 130 and the soft magnetic anti-parallel layer 131 are magnetized in parallel to each other. In this configuration, similarly, the domain-stabilization ferromagnetic layer 47 consists of a ferromagnetic film 412 and it is coupled with the ferromagnetic anti-parallel layer 134 through the anti-parallel coupling layer 411 in an antiferromagnetical manner. The anti-parallel coupling film 411 applies a bias of exchange-coupling to the ferromagnetic film 412 and the ferromagnetic anti-parallel layer 134 so that the layers 412 and 134 are magnetized in anti-parallel to each other. The amounts of magnetization in both of the ferromagnetic film 412 and the ferromagnetic anti-parallel layer 134 are set so that the difference between those amounts becomes zero substantially. Consequently, a closed flux path structure is formed between those layers 412 and 134 and the magnetic path enables the ferromagnetic film 412 and the ferromagnetic anti-parallel layer 134 to cancel the magnetization mutually at their ends in the track width direction. In addition, this difference between the magnetization amounts is reduced to zero substantially and those layers 412 and 134 are coupled through the anti-parallel coupling layer 411 so that those layers are magnetized strongly enough in anti-parallel to each other, thereby enabling the domain-stabilization ferromagnetic layer 47 in this example to function as a high coercivity layered film that is not magnetized so easily with respect to the external magnetic field. The weak anti-parallel coupling layer 415 magnetizes the ferromagnetic anti-parallel layer 134 and the soft magnetic anti-parallel layer 131 effectively in weak anti-parallel to each other.

According to this configuration, therefore, the ferromagnetic film 412, the soft magnetic anti-parallel layer 132, the soft magnetic anti-parallel layer 131, and the soft magnetic free layer 130 are formed almost in the same size in the track width direction and the ferromagnetic film 412 and the ferromagnetic anti-parallel layer 134, the soft magnetic anti-parallel layer 131 and the soft magnetic free layer 130, and the soft magnetic anti-parallel layer 131 and the ferromagnetic anti-parallel layer 134 come to be magnetized in anti-parallel to each other respectively when the external magnetic field becomes zero. Consequently, if the optimized amount of magnetization is distributed among those layers, a closed flux path is structured between the soft magnetic anti-parallel layer 131 and the soft magnetic free layer 130, as well as between the ferromagnetic film 412 and the ferromagnetic anti-parallel layer 134 that are coupled with each other static-magnetically at their ends in the track width direction, so that double or triple closed flux paths are formed in all to stabilize the domain of the soft magnetic free layer 130.

Figure 15:
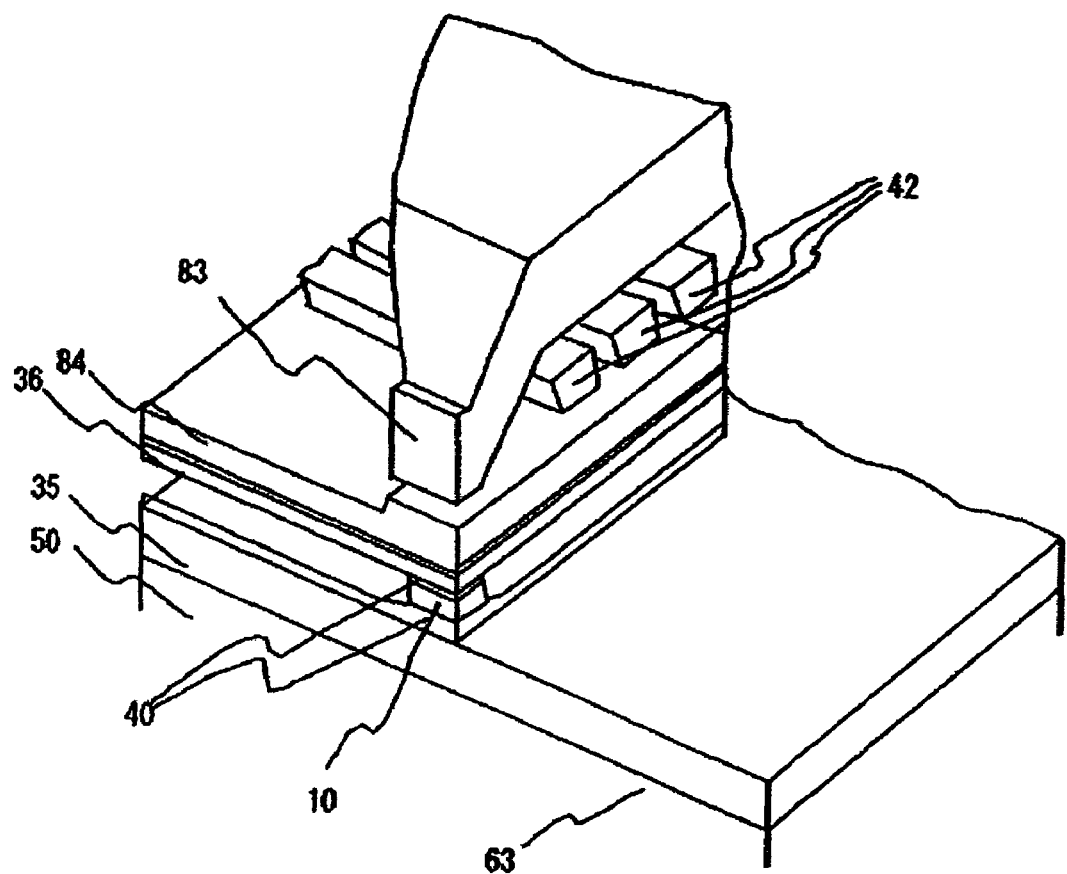
FIG. 15 is a configuration of a recording/reproducing separation type magnetic head.

FIG. 15 is a schematic diagram of a recording/reproducing separated magnetic head that uses the magnetoresistive sensor of the present invention. On a substrate that is also used as a slider are formed a magnetoresistive layered film 10, an electrode 40, a lower magnetic shield 35, an upper magnetic shield 36, a lower magnetic core 84, a coil 42, and an upper core 83, thereby a medium air bearing surface 63 comes to be formed. Although the upper magnetic shield and the lower magnetic core are provided in this figure, those parts may be replaced with a part that can be used as both of those parts without running counter to the spirit of the present invention. Similarly, while a current flows in the film thickness direction through the upper magnetic shield, the lower magnetic shield, and the electrode 40 in this figure. However, the current may flow with use of another method and in another direction without running counter to the spirit of the present invention.

Figure 16:
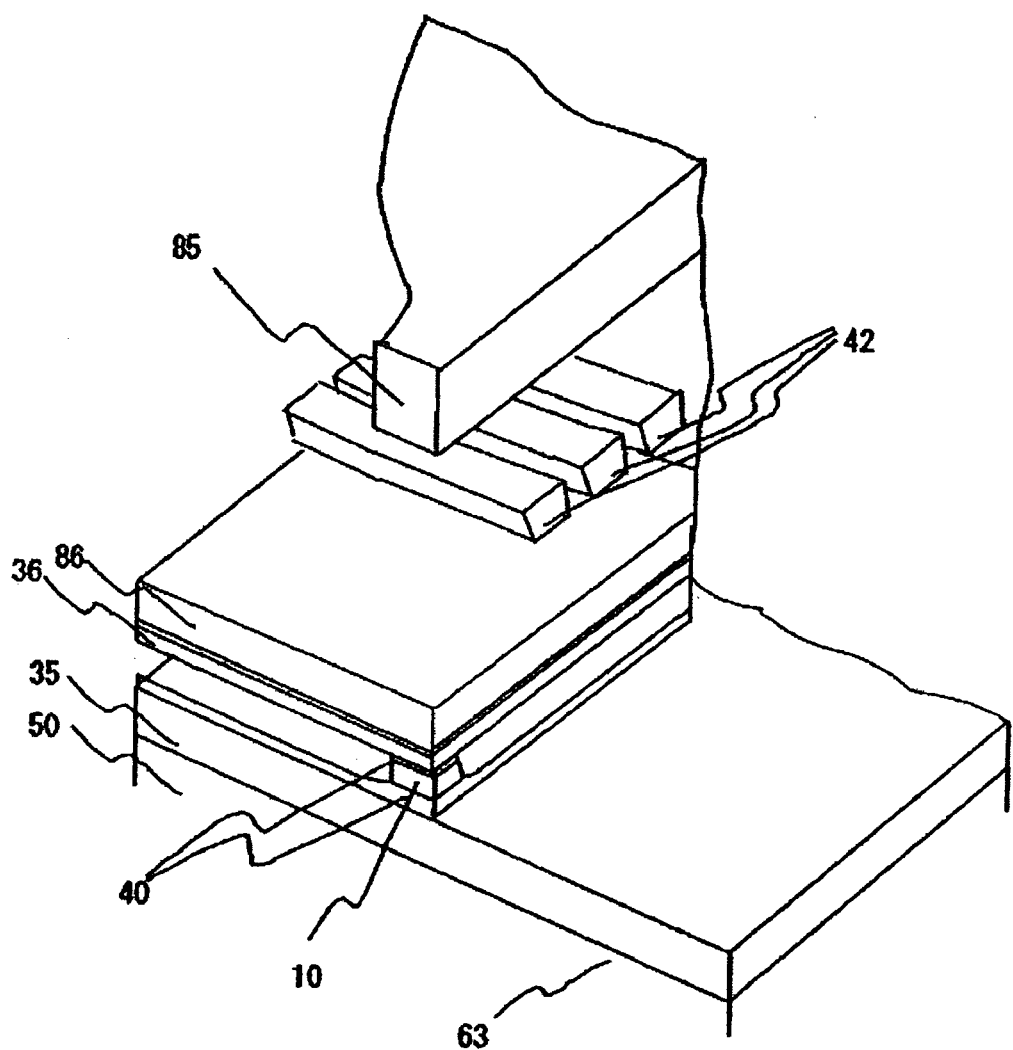
FIG. 16 is a configuration of a recording/reproducing separation type magnetic head for perpendicular recording.

FIG. 16 is a schematic diagram of a recording/reproducing separated magnetic head for perpendicular recording according to another embodiment of the present invention, which uses the magnetoresistive sensor of the present invention. On a substrate that is also used as a slider are formed a lower magnetic shield 35, an electrode 40, a magnetoresistive layered film 10, an electrode 40, an upper magnetic shield 36, a return pole 86, and a coil 42, a main pole 85, thereby a medium air bearing surface 63 is formed. Although the upper magnetic shield and the lower magnetic core are provided in this figure, those parts may be replaced with a part that can be used as both of those parts without running counter to the spirit of the present invention.

Figure 17:
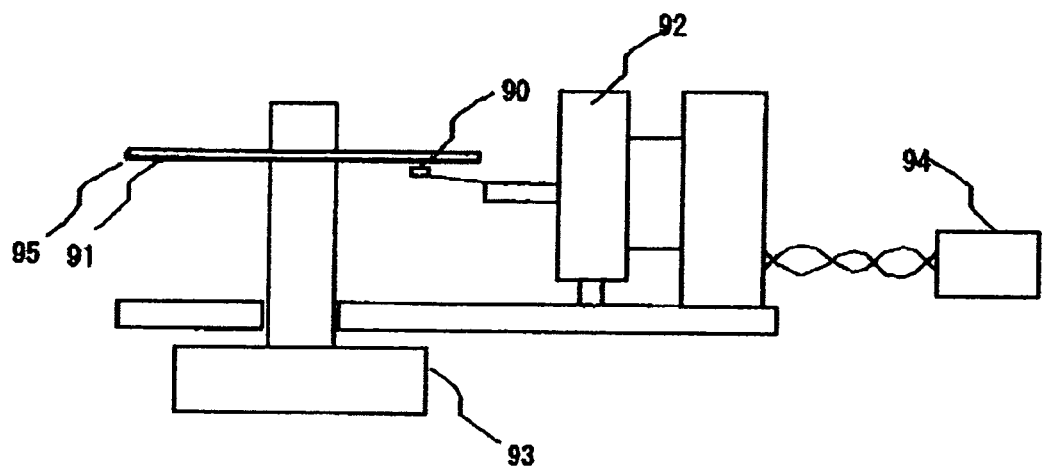
FIG. 17 is a schematic diagram of a magnetic recording/reproducing apparatus.

FIG. 17 is an explanatory view of a recording/reproducing separated magnetic head for perpendicular recording according to another embodiment of the present invention. A disk 95 that retains a recording medium 91 for recording information magnetically is rotated by a spindle motor 93 and an actuator 92 leads a head slider 90 onto a track formed on the disk 95. In other words, in the subject magnetic disk drive, a read head and a write head formed on the head slider 90 are driven relatively by this mechanism in close vicinity to a predetermined writing position on the disk 95 to write/read signals sequentially. The actuator 92 is preferably a rotary actuator. The recording medium 91 is a two-recording-layer medium having a magnetic recording layer and a soft magnetic underlayer. The write head formed on the head slider 90 is a single pole head for perpendicular recording, which is provided with a main pole and a return pole.

The write signal is recorded on the medium by the recording head through a signal processing system 94 and obtains the output of the read head as signals through the signal processing system 94. When moving the read head onto a target recording track, a high sensitivity output from the read head is used to detect a target position on the track, then the actuator is controlled to position the head slider there. In this figure, although both of the head slider 90 and the disk 95 are denoted only by one respectively, a plurality of head sliders 90/disks 95 may be provided. The recording medium 90 may also be provided on both sides of the disk 95. If information is recorded on both sides of the disk 95, the head slider 90 is also provided at both sides of the disk respectively.

As a result of test performance for the magnetic head and the magnetic recording/reproducing apparatus of the present invention, which uses the magnetic head, configured as described above respectively, it is found that each of the items has obtained desired results in output, bias performances, and reliability in operation.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head, comprising:
   a ferromagnetic pinned layer having a magnetizing direction pinned substantially with respect to a magnetic field to be perceived;
   a soft magnetic free layer formed on said ferromagnetic pinned layer through a non-magnetic intermediate layer and having a magnetizing direction that rotates in accordance with said magnetic field;
   a soft magnetic anti-parallel layer formed on said soft magnetic free layer through an anti-parallel coupling layer; and
   a domain-stabilization ferromagnetic layer formed on said soft magnetic anti-parallel layer through a weak anti-parallel coupling layer and having a magnetizing direction pinned substantially in a direction approximately orthogonal to said magnetic field;

wherein said soft magnetic free layer and said soft magnetic anti-parallel layer are coupled through said anti-parallel coupling layer in an antiferromagnetic manner strongly substantially with respect to said magnetic field; and wherein said soft magnetic anti-parallel layer and said domain-stabilization ferromagnetic layer are coupled through said weak anti-parallel coupling layer in an antiferromagnetic manner equally to or more weakly than said magnetic field substantially.

2. The magnetic head according to claim 1, wherein said soft magnetic free layer, said soft magnetic anti-parallel layer, and said domain-stabilization ferromagnetic layer are magnetized in anti-parallel to each other when said magnetic field value is zero; and double or more than double closed flux paths are formed between said soft magnetic free layer and said soft magnetic anti-parallel layer, as well as between said domain-stabilizationdomain stabilization ferromagnetic layer and said soft magnetic free layer at ends thereof in a track width direction so as to substantially cancel edge magnetization thereof mutually.

3. The magnetic head according to claim 1, wherein the sum of magnetization amounts of said soft magnetic free layer and said domain-stabilization ferromagnetic layer is almost equal to the magnetization amount of said soft magnetic anti-parallel layer.

4. The magnetic head according to claim 1, wherein said domain-stabilization ferromagnetic layer comprises an antiferromagnetic film and a ferromagnetic layer exchange-coupled with said antiferromagnetic film and magnetized in a direction approximately orthogonal to a magnetic field to be perceived by said antiferromagnetic film.

5. The magnetic head according to claim 1, wherein said ferromagnetic pinned layer comprises an antiferromagnetic film and a ferromagnetic layer exchange-coupled with said antiferromagnetic film and magnetized in a direction approximately parallel to a magnetic field to be perceived by said antiferromagnetic film.

6. The magnetic head according to claim 1, wherein said ferromagnetic pinned layer comprises a hard magnetic film or a magnetic film having a high coercivity substantially with respect to an external magnetic field and magnetized in a direction approximately parallel to a magnetic field to be perceived by said hard magnetic film or magnetic film.

7. The magnetic head according to claim 1, wherein a length of a magnetoresistive sensor from a medium air bearing surface is 1.5 to 3 times a track width.

8. The magnetic head according to claim 1, wherein said soft magnetic free layer and said soft magnetic anti-parallel layer are coupled through said anti-parallel coupling layer in an antiferromagnetic manner strongly enough substantially with respect to said magnetic field to rotate anti-parallel magnetizing directions of the soft magnetic free layer and the soft magnetic anti-parallel layer as a pair substantially with respect to the magnetic field.

9. A magnetic recording/reproducing apparatus, comprising:

a magnetic recording medium;

a medium driving part for driving said magnetic recording medium;

a magnetic head for recording/reproducing information to/from said magnetic recording medium; and a head driving part for driving said magnetic head relatively with respect to said magnetic recording medium;

wherein said magnetic head includes:

a ferromagnetic pinned layer having a magnetizing direction pinned substantially with respect to a magnetic field to be perceived;

a soft magnetic free layer formed on said ferromagnetic pinned layer through a non-magnetic intermediate layer and having a magnetizing direction that rotates in accordance with said magnetic field;

a soft magnetic anti-parallel layer formed on said soft magnetic free layer through an anti-parallel coupling layer; and a domain-stabilization ferromagnetic layer formed on said soft magnetic anti-parallel layer through a weak anti-parallel coupling layer and having a magnetizing direction pinned substantially in a direction approximately orthogonal to said magnetic field;

wherein said soft magnetic free layer and said soft magnetic anti-parallel layer are coupled through said soft magnetic anti-parallel layer in an antiferromagnetic manner strongly substantially with respect to said magnetic field; and wherein said soft magnetic anti-parallel layer and said domain-stabilization ferromagnetic layer are coupled through said weak anti-parallel coupling layer in a weak antiferromagnetic manner substantially and equally to or more weakly than said magnetic field.

10. The magnetic recording/reproducing apparatus of claim 9, wherein said soft magnetic free layer and said soft magnetic anti-parallel layer are coupled through said anti-parallel coupling layer in an antferromagnetic manner strongly enough substantially with respect to said magnetic field to rotate anti-parallel magnetizing directions of the soft magnetic free layer and the soft magnetic anti-parallel layer as a pair substantially with respect to the magnetic field.

* * * * *

UNITED STATES PATENT AND TRADEMARK OFFICE
CERTIFICATE OF CORRECTION

PATENT NO. : 7,440,240 B2  
APPLICATION NO. : 11/102067  
DATED : October 21, 2008  
INVENTOR(S) : Hiroyuki Hoshiya et al.

Page 1 of 1

It is certified that error appears in the above-identified patent and that said Letters Patent is hereby corrected as shown below:

Column 21, Claim 2, Line 22:

Change "domain-stabilizationdomain stabilization ferromagnetic layer" to

-- domain-stabilization ferromagnetic layer --.

Column 22, Claim 10, Line 49:

Change "antferromagnetic" to -- antiferromagnetic --.

Signed and Sealed this

Sixth Day of January, 2009

JON W. DUDAS  
*Director of the United States Patent and Trademark Office*